(12) United States Patent
Heckenberg

(10) Patent No.: US 11,137,047 B2
(45) Date of Patent: Oct. 5, 2021

(54) LOG WRAPPER SAFETY DEVICE

(71) Applicant: Timothy D. Heckenberg, Forest Grove, OR (US)

(72) Inventor: Timothy D. Heckenberg, Forest Grove, OR (US)

( * ) Notice: Subject to any disclaimer, the term of this patent is extended or adjusted under 35 U.S.C. 154(b) by 287 days.

(21) Appl. No.: 16/419,212

(22) Filed: May 22, 2019

(65) Prior Publication Data

US 2020/0370621 A1 Nov. 26, 2020

(51) Int. Cl.
*F16G 15/06* (2006.01)
*B66C 1/44* (2006.01)
*A01G 23/00* (2006.01)

(52) U.S. Cl.
CPC ............ *F16G 15/06* (2013.01); *A01G 23/003* (2013.01); *B66C 1/44* (2013.01)

(58) Field of Classification Search
CPC .......... F16G 15/06; A01G 23/003; B66C 1/44
USPC ............................................................ 410/98
See application file for complete search history.

(56) References Cited

U.S. PATENT DOCUMENTS

| 913,094 | A | | 2/1909 | Beaudin |
|---|---|---|---|---|
| 2,549,519 | A | | 4/1951 | Peterson |
| 2,744,766 | A | | 5/1956 | Davidson |
| 2,998,277 | A | | 8/1961 | Himel, Jr. |
| 3,204,983 | A | | 9/1965 | Rehnstrom et al. |
| 4,917,567 | A | * | 4/1990 | Renfro .................. A01G 23/006 212/167 |
| 5,156,506 | A | | 10/1992 | Bailey |
| 5,620,298 | A | * | 4/1997 | Barwise .................. B66C 1/585 294/201 |
| 6,315,344 | B1 | * | 11/2001 | Mattson ............... A01G 23/003 294/86.41 |

(Continued)

FOREIGN PATENT DOCUMENTS

| GB | 2471683 B | 3/2014 |
|---|---|---|
| JP | 01299978 A | 12/1989 |

(Continued)

OTHER PUBLICATIONS

Log Truck Wrappers, Westech Rigging Supply, downloaded from the Internet from https://www.westechrigging.com/load-securement-log-truck-wrappers.html on May 5, 2019.

(Continued)

*Primary Examiner* — Hilary L Gutman
(74) *Attorney, Agent, or Firm* — Stone Creek Services LLC; Alan M Flum

(57) ABSTRACT

A device for securing logs from harvested timber to a transport vehicle, or logging truck, using log wrappers. The log wrapper securement device can be located in the inspection cavity of a forestry grapple. The forestry grapple is attached to a log loader. The log wrapper securement device includes a base plate sized and shaped to replace the inspection plate covering the inspection cavity. The base plate includes a slot sized and shaped to receive a portion of a chain end link or other chain links of the log wrapper, which can be inserted manually. The loader operator can remotely control the actuator to secure the chain link and release it, once the log wrapper is positioned over the other side of the logging truck. The log wrapper securement device can potentially reduce injuries and save lives.

18 Claims, 26 Drawing Sheets

(56) References Cited

U.S. PATENT DOCUMENTS

| | | | |
|---|---|---|---|
| 7,234,605 B1* | 6/2007 | Torgerson | B66C 1/585 212/83 |
| 9,114,959 B1* | 8/2015 | Gallet | B66C 1/48 |
| 9,469,363 B1* | 10/2016 | Speicher | B62K 25/04 |
| 2008/0314372 A1 | 12/2008 | Guindon et al. | |
| 2009/0065093 A1* | 3/2009 | Boutte | B66C 13/40 144/24.13 |
| 2014/0028038 A1* | 1/2014 | LaValley | B26D 7/02 294/81.61 |
| 2018/0216311 A1* | 8/2018 | Kenworthy | E02F 3/141 |
| 2020/0087119 A1* | 3/2020 | Friessen | A63B 21/072 |
| 2020/0331736 A1* | 10/2020 | Colbran | B66F 9/22 |

FOREIGN PATENT DOCUMENTS

| | | | |
|---|---|---|---|
| JP | 31299978 A | 12/1989 | |
| JP | 2933110 B2 | 8/1999 | |
| WO | 9429209 A1 | 12/1994 | |

OTHER PUBLICATIONS

Mithun Shetty, Overexertion Injuries Resulting from Installing Log Load Wrapper, Contract Report CR-754-WCB, Jun. 2013, FPInnovations, Vancouver B.C., Canada.

Safety Alert, Lost Time, Loader Wrapper/Binder Assist Procedures, Mar. 8, 2018, BC Forest Safety Council, Nanaimo, BC, Canada.

Monte Biggers, Wrapping Up and Other Fun Things Truck Drivers Get Into, Idaho Logging Safety News, vol. 21, No. 2, p. 6, Jun. 2010, Sate of Idaho Division of Building Safety, Logging Safety Bureau, Kamiah, Idaho.

Roots of Motive Power, Inc., vol. 19, No. 3, p. 30, Dec. 2001, Roots of Motive Power, Inc., Willits, California.

General Requirement/Loading K, Oregon Administrative Rules Oregon Occupational Safety and Health Division, 437-007-1010 to 437-007-1060, Oregon Occupational Health and Safety (Oregon OSHA), Salem, Oregon, downloaded from the Internet from https://osha.oregon.gov/OSHARules/div7/div7K.pdf on May 7, 2019.

3/8" x 28 ft Log Truck Wrapper w/ 8 ft of 5/16" G70 Chain, Westech Rigging Supply, downloaded from the Internet from https://www.westechrigging.com/log-wrapper-28-516x08-g70.html on May 5, 2019.

Cable-Lite 26 ft Synthetic Log Truck Wrapper w/ 8 ft of 9/32" G100 Chain, Westech Rigging Supply, downloaded from the Internet from https://www.westechrigging.com/log-wrapper-cable-lite-18.html on May 5, 2019.

Reducing Repetitive Strain Injuries Resulting from Installing Log Load Wrappers, FP Innovations, screen shots and transcript downloaded from the Internet https://www.youtube.com/watch?v=Jnbh-ZVNC5U on May 7, 2019.

Swing Machines 2154D/2454D/2954D/3754D, Nov. 2006, John Deere and Company, Moline, Illinois.

John J. Garland, John Sessions, Steve Pilkerton, Joel Hartter, Synthetic Rope to Replace Wire Rope in Mountain Logging Operations, Austro2003: High Tech Forest Operations for Mountainous Terrain, Oct. 5-9, 2003, Schlaegl, Austria, downloaded from the Internet from https://www.researchgate.net/publication/228710781 on May 7, 2019.

Grapples GLK55, Caterpillar Inc., downloaded from the Internet from https://www.cat.com/en_US/products/new/attachments/grapples/log-grapples/5099102475455515.html on May 12, 2019.

Log Loaders, U.S. Forest Services, Washington, D.C., downloaded from the Internet from https://www.fs.fed.US/forestmanagement/equipment-catalog/logloaders.shtml on May 13, 2019.

B1.309 Threaded-Body Universal Cylinder, Nov. 2018, Roemheld GmbH, Laubach, Germany.

B1.310 Universal Clamping Cylinder, Nov. 2018, Roemheld GmbH, Laubach, Germany.

B1.5091 Block Cylinders, Nov. 2018, Roemheld GmbH, Laubach, Germany.

Log Grapples, Mar. 2019, Young Corporation, Seattle, Washington.

Jewell 2014 Product Catalog, Aug. 2017, International Equipment Solutions, Portland, Oregon.

Forestry Grapples, Mar. 2012, Pierce Pacific Manufacturing Inc., Baton Rouge, Louisiana.

Precision Hydraulic Clamping Catalog, Jan. 2010, sections F1-F13, Vektek, Emporia, Kansas.

Doosan Log Loaders, May 2018, Doosan Infracore, Suwanee, GA.

CAT 568 Forest Machine, May 2011, Caterpillar Inc., Boonville, Missouri.

Link-Belt 4040 Forestry Equipment Specifications, Mar. 2019, LBX Company, Lexington KY.

890 Logger, Feb. 2019, TigerCat International Inc., Ontario, Canada.

250D/T250D Loader, Feb. 2019, TigerCat International Inc., Ontario, Canada.

Log Truck Wrappers, Westech Rigging Supply, downloaded from the Internet from https://www.westechrigging.com/oad-securement-log-truck-wrappers.html on May 5, 2019.

Bob Simonson, Andy Horcher, Grapples, Feb. 2005, Forest Management, San Dimas, downloaded from the Internet from https://www.fs.fed.US/t-d/programs/forest_mgmt/saleprep/smallwood/Grapples.pdf on May 12, 2019.

* cited by examiner

LOG WRAPPER SAFETY DEVICE

BACKGROUND

This disclosure relates to securing logs from harvested timber to a transport vehicle or logging truck. This includes devices or methods that aid in safely securing the logs using binders or log wrappers.

Logs from timber harvesting are often transported from the forest by logging trucks. Logging trucks typically are semi-tractor units with logging truck trailers. A log loader, also known as a forestry swing machine, picks up logs from the ground using a forestry grapple and loads the logs onto the logging truck. The logging truck trailers used for transporting logs include four posts called bunks. The bunks prevent the logs from rolling off either side of the logging truck trailer. In addition, log wrappers, also known in the logging industry simply as "wrappers," wrap around the loaded logs. The ends of the log wrapper are tightened and secured together. A log wrapper is typically a cable with a length of heavy chain attached to both ends. Traditional cable log wrappers typically include ⅜ inches (0.00952 meters) thick wire cable, with a 5/16 inches (0.00794 meters) or 9/32 inches (0.00714 meters) chain attached at both ends of the wire cable. Traditional cable log wrappers are approximately 26 feet (7.92 meters) to 28 feet (8.53 meters) long and weigh about 12 lbs. (5.44 kg.). Three or more log wrappers are used per logging truck to secure the load. Each cable log wrapper typically has support strength of 15,000 lbs. (6803.9 kg.) or more. The number of log wrappers, their construction, and strength are specified by state or federal regulations. Often, in order to wrap the log wrapper around the loaded logs, the logging truck driver will manually throw one end of the log wrapper over the top of the logs and then pull the thrown end underneath the logging truck trailer to join with the other end of the log wrapper. The logs are typically loaded 14 feet (4.27 meters) to 17 feet (5.18 meters) high, and 10 feet wide (3.05 meters). The logging truck driver may throw sixteen or more log wrappers over the top of the loaded logging trucks per day. Throwing the cable this many times and over a 14-foot (4.27-meter) to 17 feet (5.18 meters) high load can be challenging and cause injury. This often causes repetitive stress injury to the rotator cuff and other parts of the shoulder, as well as repetitive stress injury to the arm, elbow joint, back, and hip. In addition, if the cable does not clear the top of the load, it may fall back and hurt the driver.

One attempted solution is the use of lighter-weight log wrappers. These log wrappers, known as synthetic log wrappers, use synthetic fiber instead of wire cable. Chains are attached to both ends of the synthetic fiber. Synthetic log wrappers can have breaking strength similar to traditional log wrappers. Synthetic log wrappers can weigh approximately 8.5 lbs. (3.86 kg.). While synthetic log wrappers can potentially reduce repetitive stress injury to the shoulder and arms, they do not eliminate it.

Another solution is to have the log loader that loads the logs into the logging truck, carry the log wrapper and drop it over the top of the load onto the other side of the logging truck trailer. With forestry grapple positioned near the ground, and with the grapple arms together, the driver throws a portion of the log wrapper over the forestry grapple. The forestry grapple may be in motion while the driver throws the log wrapper in order to save time. The log loader lifts the forestry grapple over the load, opens the closed grapple arms and drops the log wrapper on the ground on the other side of the logging truck. The driver retrieves the log wrapper end by pulling it under the truck and secures the load by cinching the two ends of the log wrapper. This is known as loader assisted wrapper securement.

SUMMARY

The inventor observed that the loader assisted wrapper securement method could potentially put the driver in harm's way from the forestry grapple. Typically, the logging truck driver throws part of the log wrapper and chain over the closed jaws of a moving forestry grapple that is in close proximity to the driver. The driver releases the remaining end of the log wrapper as the forestry grapple moves away which may cause the dangling end to hit the driver. In addition, the log loader can potentially damage the log wrapper because it requires that a portion of the log wrapper cable be placed over the grapple arms. Depending on how the log wrapper cable is placed, it can get pinched or nicked by the moving parts of the grapple arms, as the grapple arms open to release the log wrapper. In addition, while repetitive stress injury is reduced, it may not be totally eliminated. Using the loader assisted wrapper securement technique, the logging truck driver often will throw about a third of the log wrapper over the top the closed forestry grapple as it moves close to the ground. This takes timing and coordination. When repeated, it could potentially lead repetitive stress injury.

The inventor created a log wrapper securement device that attempts to address the shortcomings of both conventional wrapping techniques and loader assisted wrapper securement. The inventor's log wrapper securement device passes one or more log wrappers at a time over a loaded logging truck. The log wrapper securement device uses a rod extending from a linear actuator to engage a bracket to catch and hold a chain link, such as the chain end link, of the log wrapper. The linear actuator and rod are positioned behind a base plate. The base plate includes a slot sized and shaped to accept and passthrough a portion of the chain link. The linear actuator extends and contracts the rod behind the slot and across (i.e., transverse to) the length of the slot. Forestry grapples used for logging operations typically include an inspection plate covering an inspection cavity to access hydraulic lines. For forestry grapples that use an electrical motor, rather than hydraulic cylinders to control movement of the forestry grapples, the inspection cavity can be used to house the motor assembly. The inventor recognized that he could size and shape the log wrapper securement device to fit into the inspection cavity and size and shape the base plate of the log wrapper securement device to replace the inspection plate. The outside surface of the base plate is positioned away from the grapple arms and other moving parts of the forestry grapple and log loader. The components of the log wrapper securement device are protected from logs, tree limbs, rocks, and moving parts of the forestry grapple and log loader by the inspection cavity and the base plate.

The following is an example of the how the log wrapper securement device can be used. The loader operator places the forestry grapple in a stationary position near or on the ground. The logging truck driver or other personnel places a chain link of the log wrapper, typically the chain end link, inside the slot of the log wrapper securement device. The logging truck driver signals the loader operator. The loader operator remotely controls the log wrapper securement device so that the actuator extends the rod through the chain link. If the log wrapper securement device is capable of securing more than one log wrapper, the logging truck driver and log loader operator repeat the previous step for the other log wrappers. Once this is complete, the logging truck driver steps away from the log loader out of harm's way. Once the logging truck driver is out of harm's way, the loader operator lifts the forestry grapple, with the log wrapper secured to the log wrapper securement device, and moves it over the top of the load. Once the forestry grapple is in position, the loader operator releases the log wrapper from the log wrapper securement device by remote control. The rod is retracted by the actuator and this releases the chain link.

The log wrapper securement device and the described method have several advantages. First, the logging truck driver does not have to be in harm's way. The forestry grapple is stationary while the log wrapper is being secured to the log wrapper securement device. Second, repetitive stress injury from throwing is eliminated. There is no throwing involved, and the operation does not depend on throwing the log wrapper onto a moving target. Third, the risk of damaging the log wrapper is greatly reduced because the log wrapper is secured to an area of the forestry grapple out of the way of moving parts. The jaws can remain stationary while the log wrapper is lifted and released by the log loader. Fourth, the log wrapper securement device can be constructed to lift more than one log wrapper thereby increasing efficiency.

The linear actuator can be a linear electric actuator such as linear solenoid. Alternatively, the linear actuator can be a hydraulic linear actuator. The electrical or hydraulic lines controlling the actuator can run through the inspection cavity and over the top of the swing arm to the cab of the log loader, with the other hydraulic lines that control the forestry grapple. The loader operator can release or engage the actuator by a switch or other actuator control within the loader cab. The actuator control is within the loader cab and controls the electrical or hydraulic line going to the actuator.

The log wrapper securement device can include more than one slot and actuator to secure and lift several log wrappers over the logging truck at a time. The inventor envisions his log wrapper securement device can be adapted for use with a wide range of forestry grapples and log loaders and can significantly help to reduce injuries.

This Summary introduces a selection of concepts in simplified form that are described in the Description. The Summary is not intended to identify essential features or limit the scope of the claimed subject matter.

DRAWINGS

DESCRIPTION

The terms "top, "bottom," "front," "rear," and "side," are relative terms used throughout this disclosure to help the reader understand the figures. Unless otherwise indicated, these do not denote absolute direction or orientation and do not imply a particular preference. Specific dimensions are intended to help the reader understand the scale and advantage of the disclosed material. Dimensions given are typical and the claimed invention is not limited to the recited dimensions. Throughout this disclosure, any reference to specific personnel such as a logging truck driver or a loader operator is merely to help the reader understand the context of the figures. This does not imply that the inventive concept or the figure descriptions are limited to use by only these personnel.

The following terms are used throughout this disclosure and are defined here for clarity and convenience.

Log Loader: As defined in this disclosure, log loader is a machine that uses a forestry grapple to gasp and hold logs and load them onto a transport vehicle. Log loaders are often referred to in the logging industry as "forest swing machines" or simply as "loaders."

Forestry Grapple: As defined in this disclosure, a forestry grapple is defined as a device connectable to a log loader that can grasp, hold, and release logs so that the log loader, using a forestry grapple, can grasp the log, lift it, and release the log onto a transport vehicle. The forestry grapple includes a grapple head, a grapple bearing, and grapple arms or "jaws." The grapple head is the portion of the forestry grapple mounted above the grapple bearing. The grapple bearing allows the forestry grapple arm assembly to rotate independently of the grapple head.

Inspection Cavity: As defined in this disclosure, an inspection cavity is a cavity in the grapple head positioned above the grapple bearing. The inspection cavity typically is used to route hydraulic or electrical wires into the forestry grapple but can also house a hydraulic or electric motor.

Figure 1:
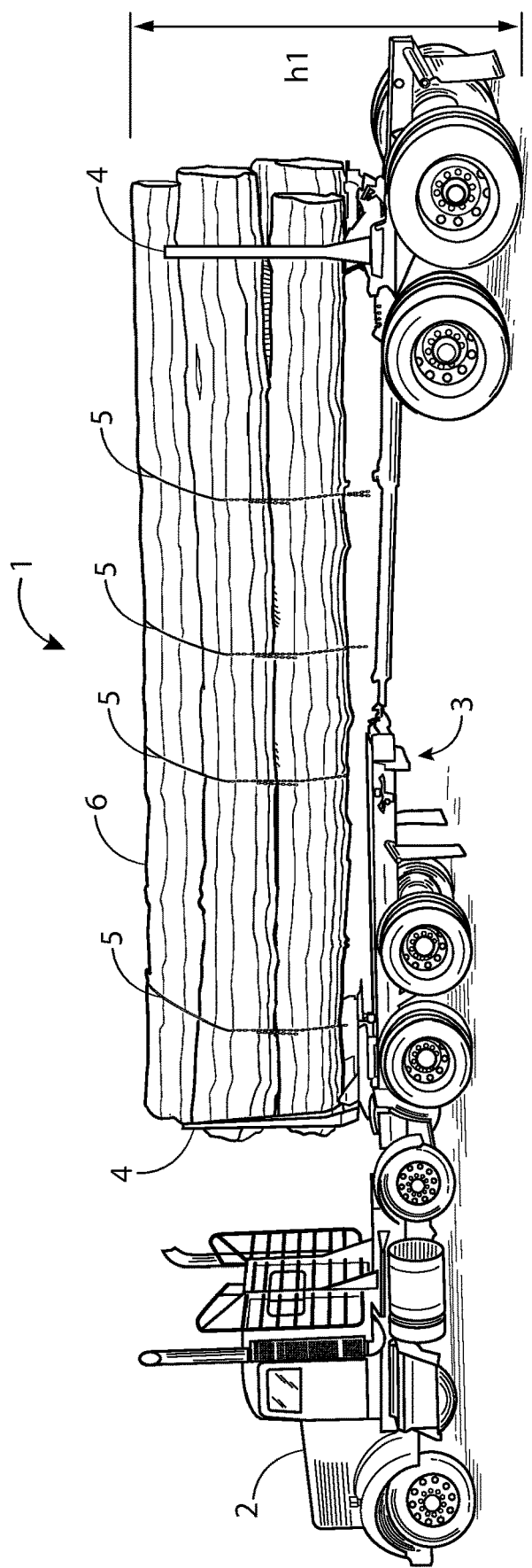
FIG. 1 illustrates a logging truck loaded with logs, in the prior art.

As discussed in the Background section, logs from timber harvesting operations are often transported from the forest by logging trucks. FIG. 1 shows a typical logging truck, in the prior art. The logging truck 1 includes a semi-tractor 2 with a logging truck trailer 3. The logging truck trailer 3 includes bunks 4, or support posts that extend from the logging truck trailer 3. The bunks 4 prevent the logs from rolling off either side of the logging truck trailer 3. Each of the log wrappers 5 wrap around the logs 6. The log wrappers 5 are tightened and secured around the logs 6 and the logging truck trailer 3. Four of the log wrappers 5 are shown securing the logs 6 to the logging truck trailer 3. The number of log wrappers 5, their construction, and strength, are specified by state or federal regulations.

Figure 2:
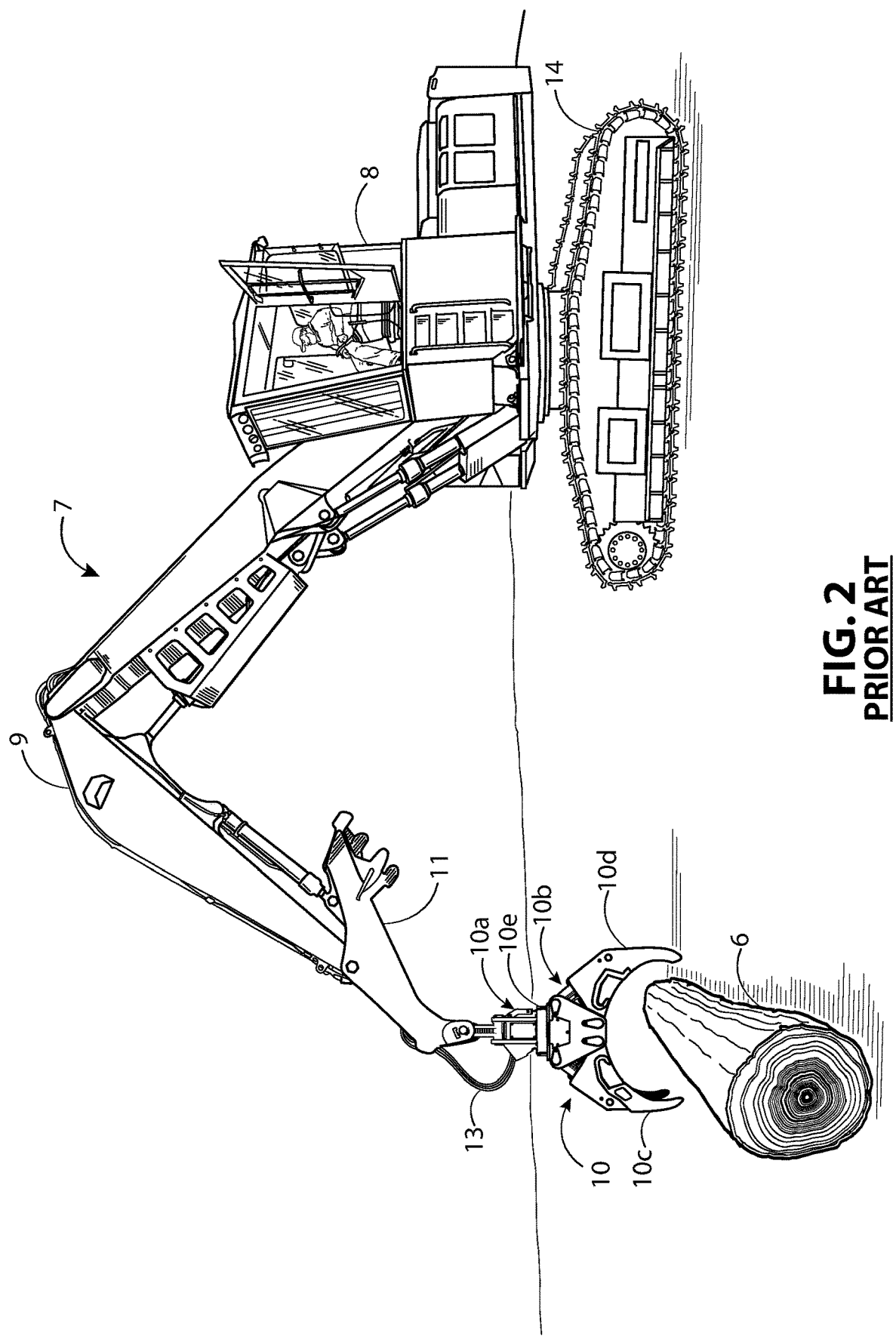
FIG. 2 illustrates a log loader with a forestry grapple, in the prior art.
Figure 3:
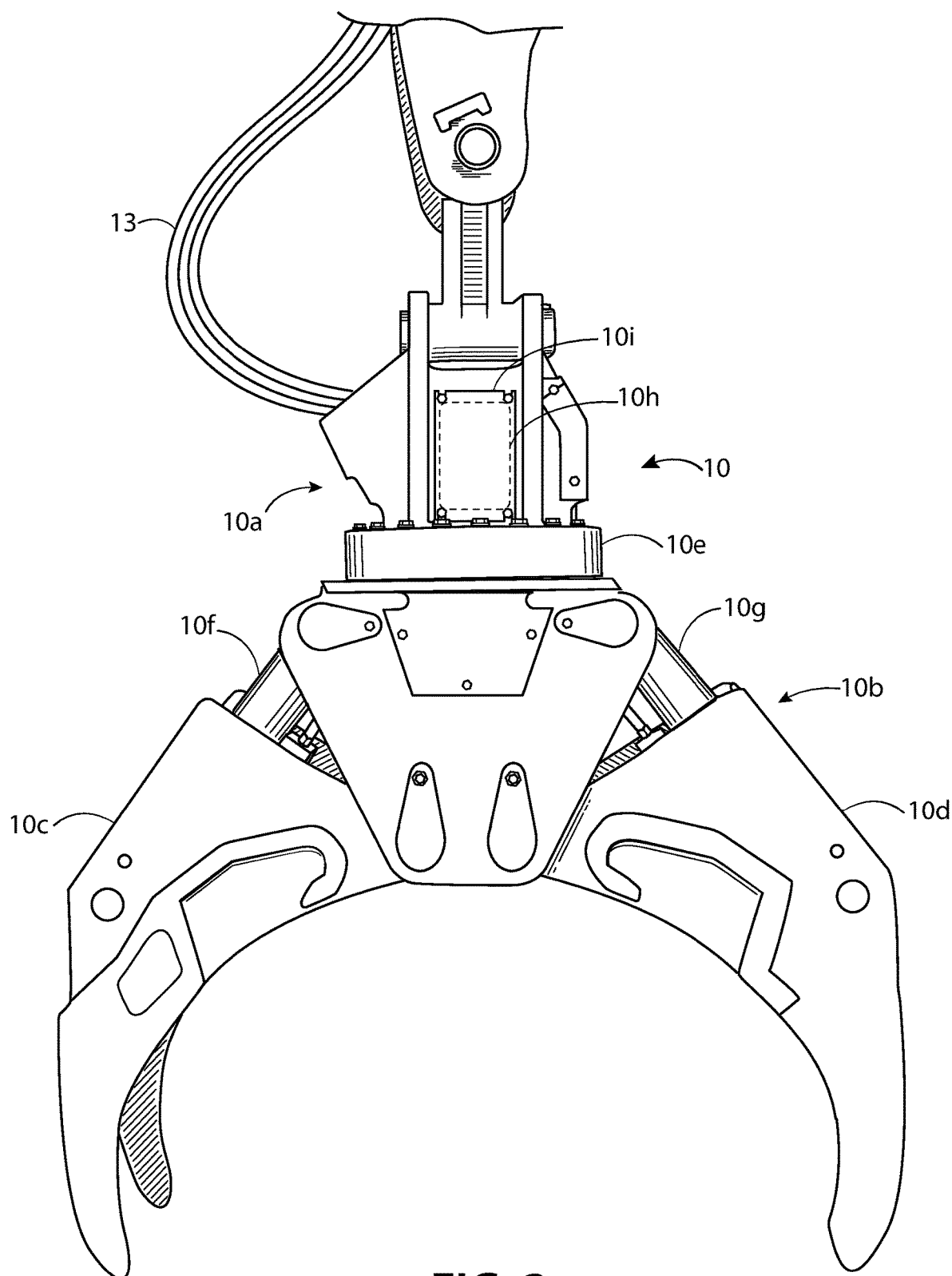
FIG. 3 illustrates an enlarged view of a portion of FIG. 2 showing the inspection plate covering an inspection cavity, in the prior art.

Referring to FIG. 2, a log loader 7, is often used to load logs on to the logging truck trailer of FIG. 1. Examples of log loaders 7 suitable for forestry logging operations include the 2495D by John Deere, the 890 Logger by Tigercat International, Inc., and the 568 Forest Machine from Caterpillar Inc. The log loader 7 as illustrated, includes a cab 8, a boom 9 extending from the cab 8, a forestry grapple 10 extending from the end of the boom 9, and a heel 11 positioned on the boom 9 above the forestry grapple 10. The cab 8 is generally enclosed and provides a safe environment for the loader operator. The boom 9 is used to position the forestry grapple 10. Referring to FIGS. 2 and 3, the forestry grapple 10 includes a grapple head 10a, a grapple body 10b, and grapple arms 10c, 10d, or "jaws" that grasp and hold one or more of the logs 6 (FIG. 2). The grapple body 10b can also rotate about a grapple bearing 10e. The grapple bearing 10e forming the base of the grapple head 10a. The boom 9 and forestry grapple 10 are illustrated as hydraulically controlled with hydraulic hoses 13 feeding the grapple head 10a.

Referring to FIG. 3, the hydraulic hoses 13 control the hydraulic cylinders 10f, 10g to move the grapple arms 10c, 10d, respectively. The hydraulic hoses pass into the grapple head 10a and through an inspection cavity 10h. The inspection cavity 10h is covered by an inspection plate 10i, also known as a grapple guard. The inspection cavity 10h is shown in a dashed line indicating that it is hidden from view behind the inspection plate 10i. For forestry grapples 10 that use an electrical motor, rather than hydraulic cylinders to control movement of the forestry grapples 10, the inspection cavity 10h is used to house the motor assembly.

The boom 9, forestry grapple 10, and heel 11 can be electrically controlled rather than hydraulically controlled. For forestry grapples 10 that are electrically controlled, a motor assembly can control the rotation of the grapple body 10b and the movement of the grapple arms 10c, 10d. The motor assembly is typically mounted in the inspection cavity 10h behind the inspection plate 10i.

Referring to FIG. 2, the heel 11 aids with log handling. The heel 11 prevents the log 6 from swinging into the boom 9 and provides additional support for the forestry grapple 10. The heel 11, as illustrated, is hydraulically controlled. A heel 11 that is hydraulically or electrically controlled is known as a "live heel" because it can move with respect to the boom 9. The heel 11 can also be fixed to the boom 9. A heel 11 that is fixed to the boom 9 is known as a "fixed heel." With the grapple arms 10c, 10d closed, the forestry grapple 10 can be retracted into the heel 11 and shrouded for storage. The log loader 7 is illustrated as including tracks 14. The tracks 14 aid in moving the log loader 7 around on uneven terrain. The log loader 7 can alternatively have wheels, or a fixed base.

Figure 4:
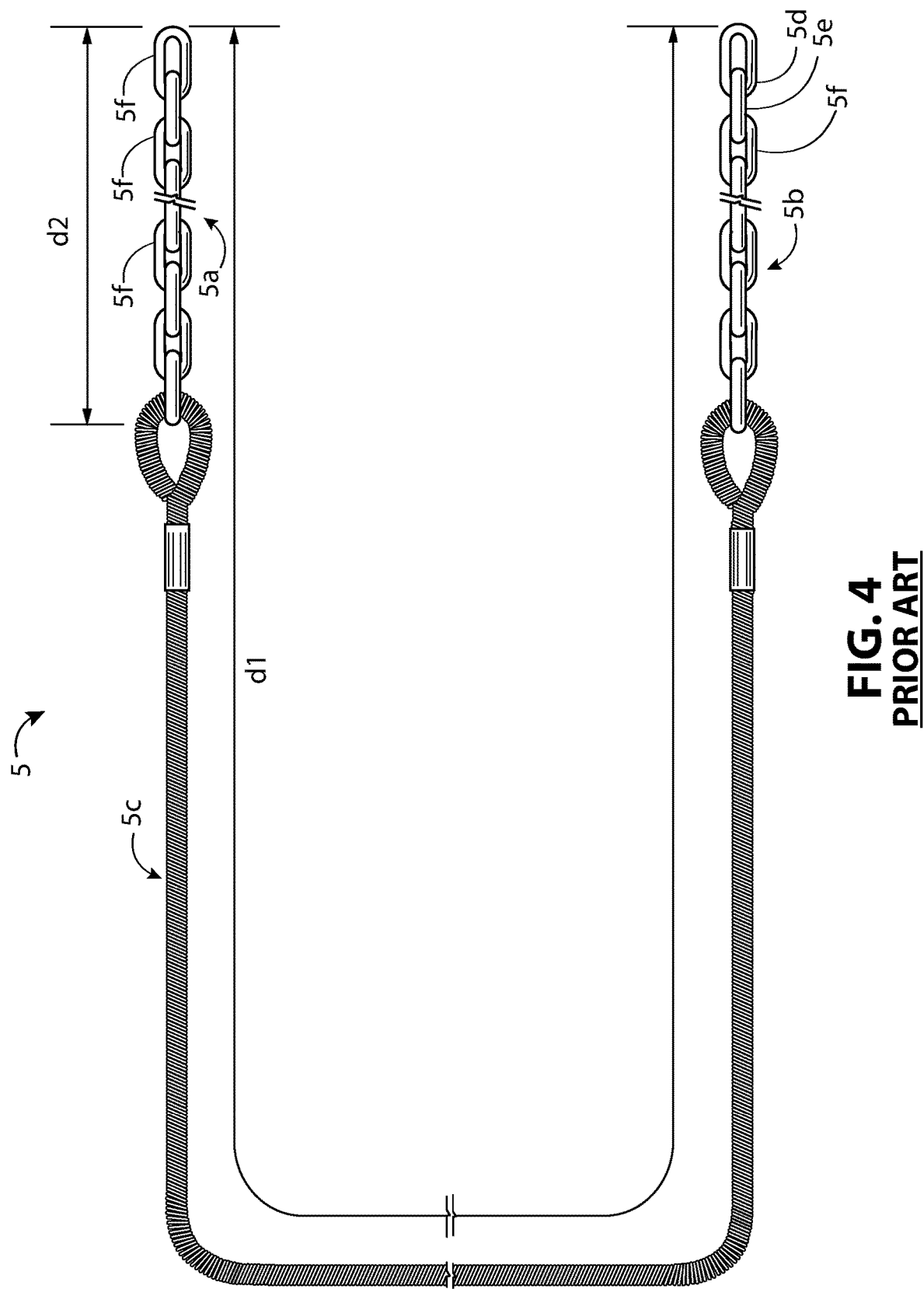
FIG. 4 illustrates the log wrapper of FIG. 1 in the prior art.

FIG. 4 illustrates a log wrapper 5 of FIG. 1 in the prior art. The cable and chains are shown cut (i.e., broken away) to represent the figure is shortened for illustrative purposes. The log wrapper 5 can include chains 5a, 5b attached to both ends of a cable 5c. The cable 5c is typically constructed of wire cable, such as steel. Alternatively, the cable can be constructed from synthetic material. Each of the log wrappers 5, typically has a holding strength of 15,000 lbs. (6803.9 kg.) or more. The length d1 of the log wrapper 5 is typically 26 feet (7.92 meters) to 28 feet (8.53 meters). The length d2 of each of the chains is typically 2 feet (0.61 meters) to 10 feet (3.05 meters). Referring to FIG. 1, the logging truck driver typically will manually throw one end of the log wrapper over the top of the logs and then pull the thrown end underneath the logging truck trailer to join with the other end of the log wrapper. The height h1 of the loaded logs are typically loaded 14 feet (4.27 meters) to 17 feet (5.18 meters) high, and 10 feet wide (3.05 meters). The log wrapper 5 using a wire cable can typically weigh approximately 12 lbs. (5.44 kg.). A log wrapper 5 using a synthetic cable typically weigh 8.5 lbs. (3.86 kg.). The logging truck driver typically throws sixteen or more log wrappers over the top of the loaded logging trucks per day. This often causes repetitive stress injury to the rotator cuff and other parts of the shoulder, as well as repetitive stress injury to the arm, elbow joint, back, and hip. In addition, if the cable does not clear the top of the load, it may fall back and hurt the driver.

Referring to FIG. 2, one attempted solution, in the prior art, is the log loader assisted log wrapper securement method. The log loader 7 lifts the log wrapper 5 and drop it over the top of the logging truck trailer 3 of the logging truck of FIG. 1. With the forestry grapple 10 positioned near the ground, and with the grapple arms 10c, 10d closed, the driver throws a portion of the log wrapper 5 of FIG. 1 over the forestry grapple 10. The log loader 7 lifts the forestry grapple 10 over the load, opens the grapple arms 10c, 10d and drops the log wrapper 5 of FIG. 4 on the ground on the other side of the logging truck 1 of FIG. 1.

The inventor observed that the loader assisted wrapper securement method could potentially put the logging truck driver in harm's way from the forestry grapple 10. Typically, the logging truck driver throws part of the log wrapper 5 over the grapple arms 10c, 10d while the forestry grapple 10 is moving in close proximity to the driver. The driver releases the end of the log wrapper 5 as the forestry grapple 10 moves away, which may cause the dangling end to hit the driver. In addition, the log loader 7 can potentially damage the log wrapper 5 of FIG. 4 because it requires that a portion of the log wrapper 5 be placed over the grapple arms 10*c*, 10*d*. Depending on how the log wrapper 5 is placed it can get pinched or nicked by the moving parts of the grapple arms 10*c*, 10*d* as they open to release the log wrapper 5. In addition, while repetitive stress injury is reduced, it may not be totally eliminated. Using the loader assisted wrapper securement technique, the logging truck driver often will throw about a third of the log wrapper 5 over the top the forestry grapple 10 as it moves close to the ground. This takes timing and coordination. When repeated, it could potentially lead repetitive stress to injury.

Figure 5:
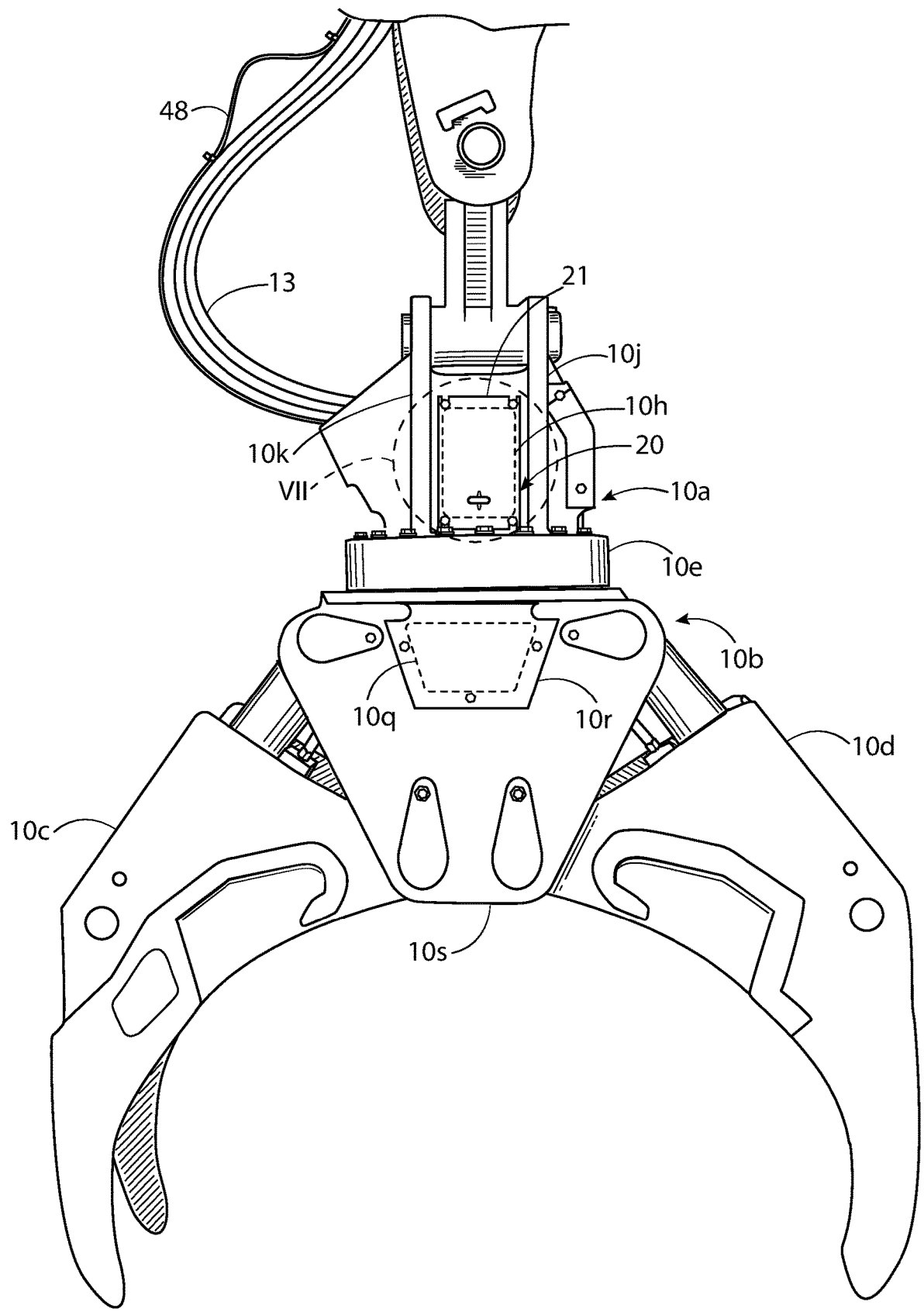
FIG. 5 illustrates in front view, the forestry grapple with the log wrapper securement device mounted in the inspection cavity of the forestry grapple.

Referring to FIG. 5, the inventor created a log wrapper securement device 20 that attempts to address the shortcomings of both conventional wrapping techniques and loader assisted wrapper securement. The log wrapper securement device 20 developed by the inventor, passes one or more log wrappers 5 at a time over a loaded logging truck as will be discussed for FIGS. 14, and 16-19. The inventor recognized that he could size and shape the log wrapper securement device 20 to fit into the inspection cavity 10*h* of the grapple head 10*a*. The inspection cavity 10*h* is shown in dashed lines to indicate that it is hidden behind the base plate 21 of the log wrapper securement device 20. The base plate 21 is sized and shaped to replace the inspection plate 10*i* of FIG. 3.

Figure 6:
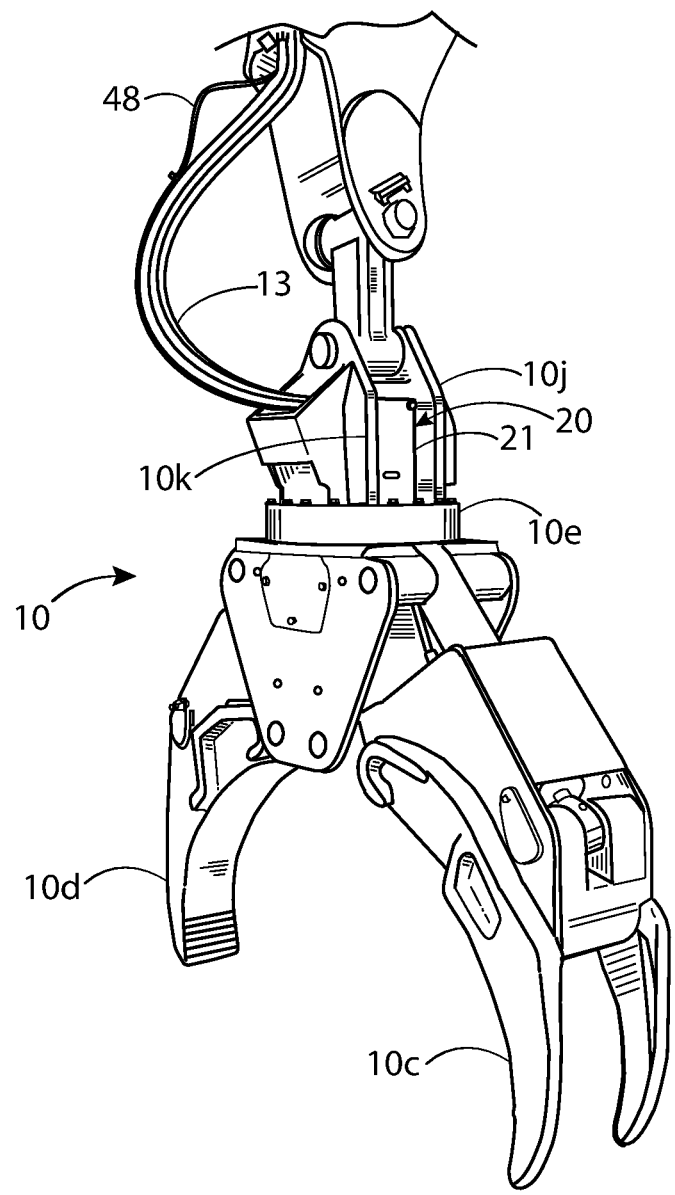
FIG. 6 illustrates, in front perspective view, the forestry grapple with the log wrapper securement device mounted in the inspection cavity of the forestry grapple.
Figure 14:
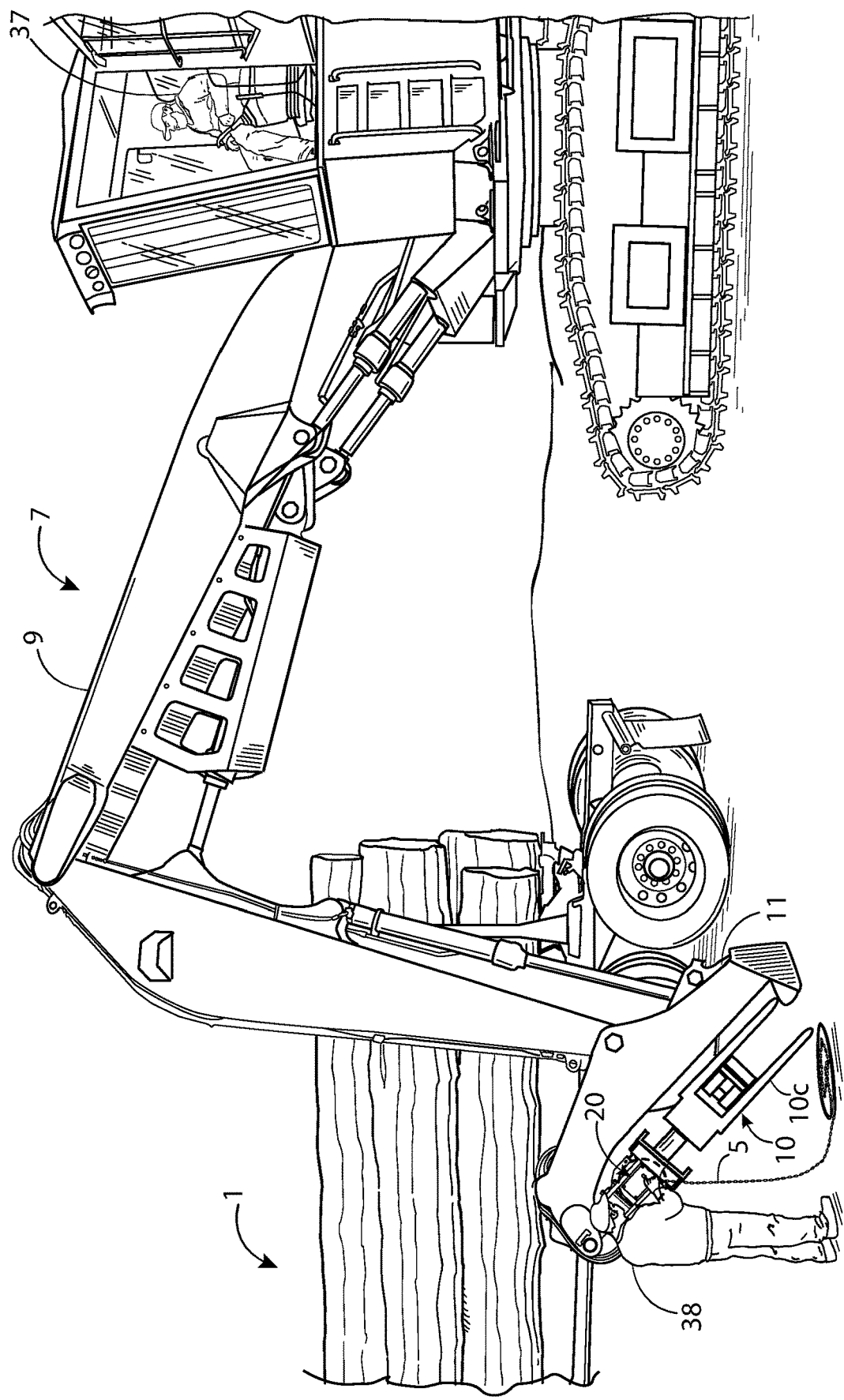
FIG. 14 illustrates, in front perspective view, the log loader and logging truck with the logging truck driver engaging the log wrapper in the log wrapper securement device.
Figure 18:
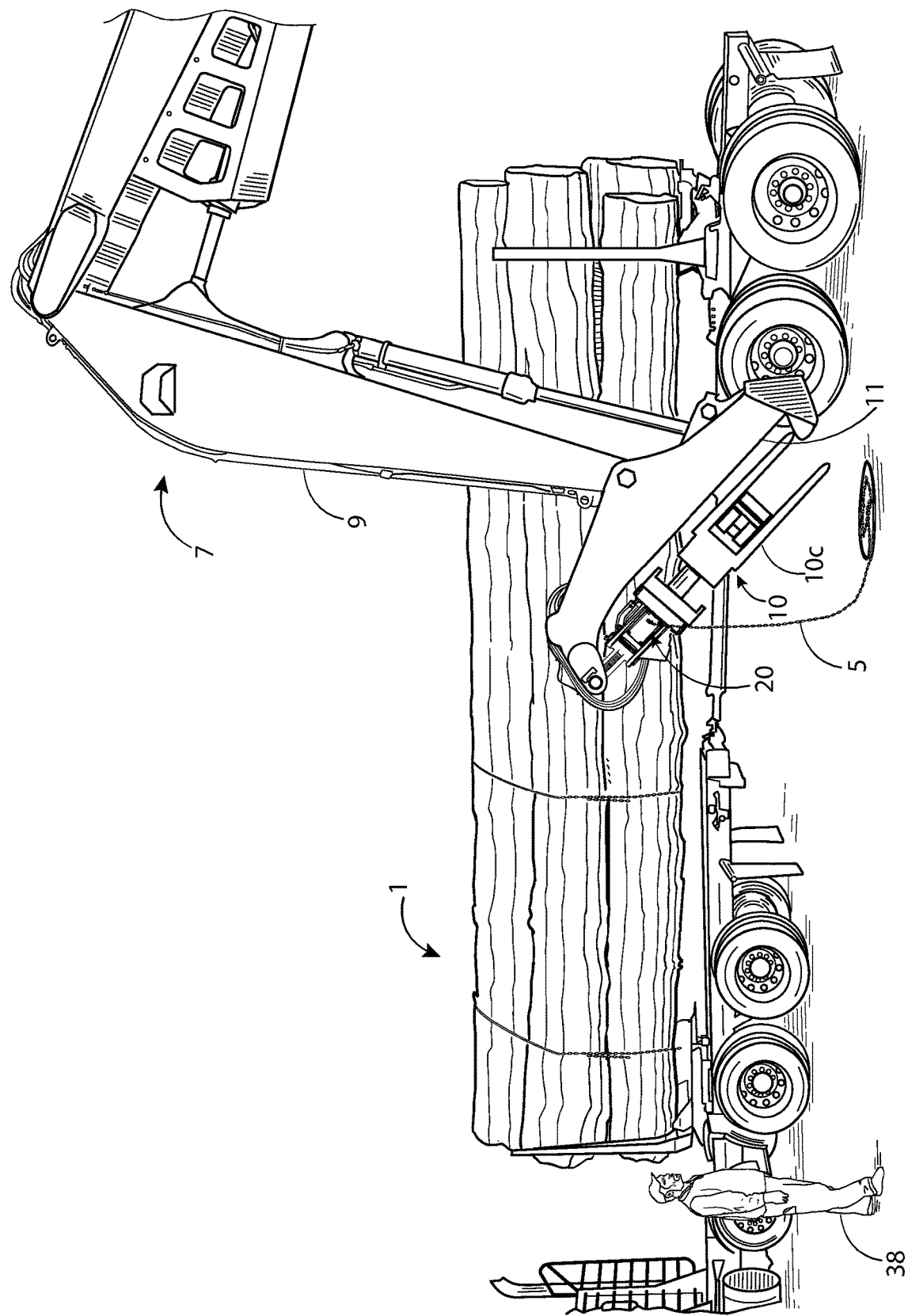
FIG. 18 illustrates, in front perspective view, the log loader and logging truck with the log loader lifting the log wrapper after the logging truck driver has stepped out of harm's way.
Figure 19:
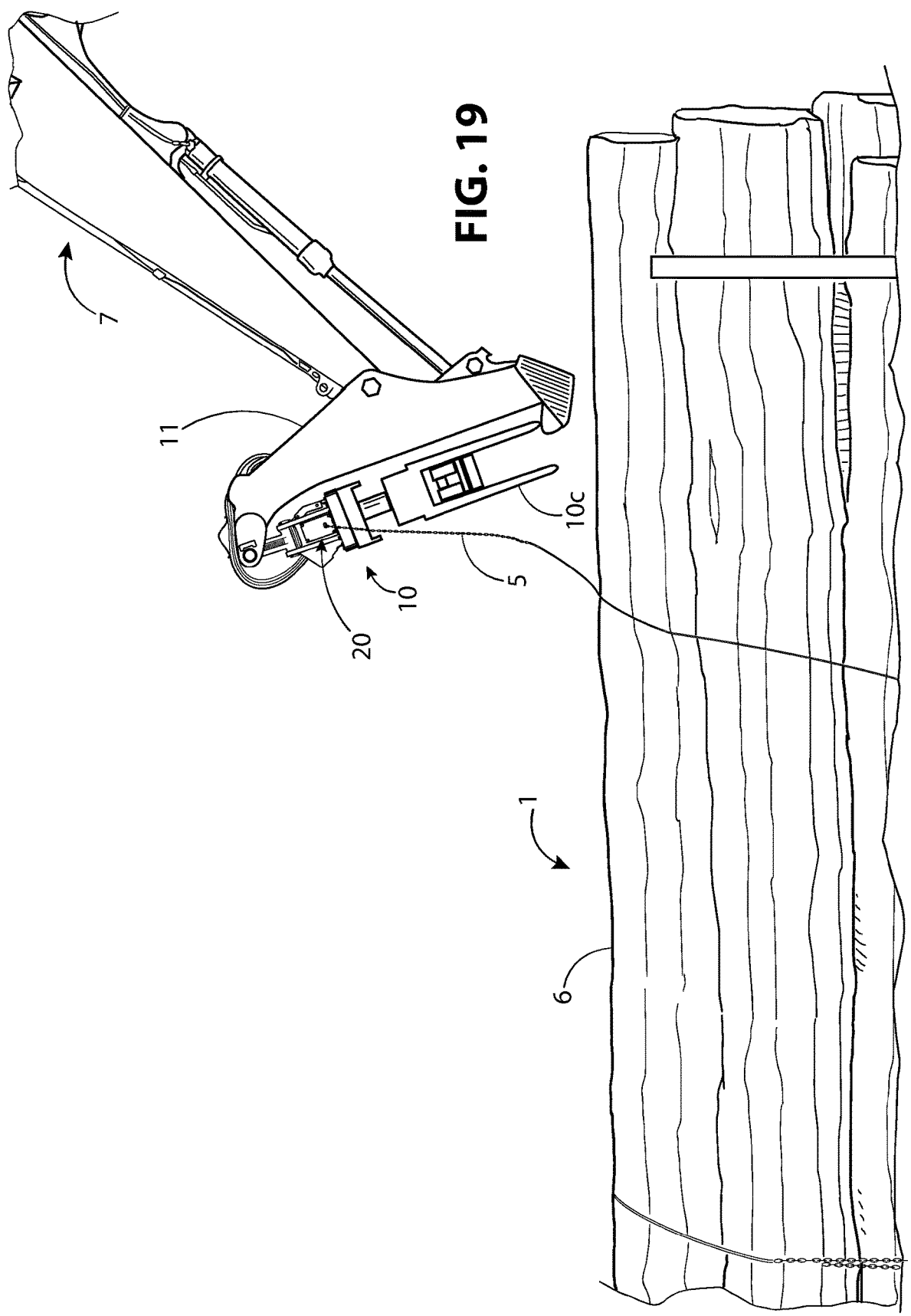
FIG. 19 illustrates the log loader lifting the log wrapper over the top of the loaded logging truck.

Referring to FIGS. 5 and 6, The outside surface of the base plate 21 is indented within the grapple head sides 10*j*, 10*k* and the grapple bearing 10*e*. This positions the base plate 21 away from the grapple arms 10*c*, 10*d* and other moving parts of the forestry grapple 10 and log loader 7 (FIGS. 14, 18, and 19). The components of the log wrapper securement device 20 are protected from logs, tree limbs, rocks, and moving parts of the forestry grapple 10 and log loader 7 by the grapple head sides 10*j*, 10*k*, the grapple bearing 10*e*, the inspection cavity 10*h*, the base plate 21.

Figure 7:
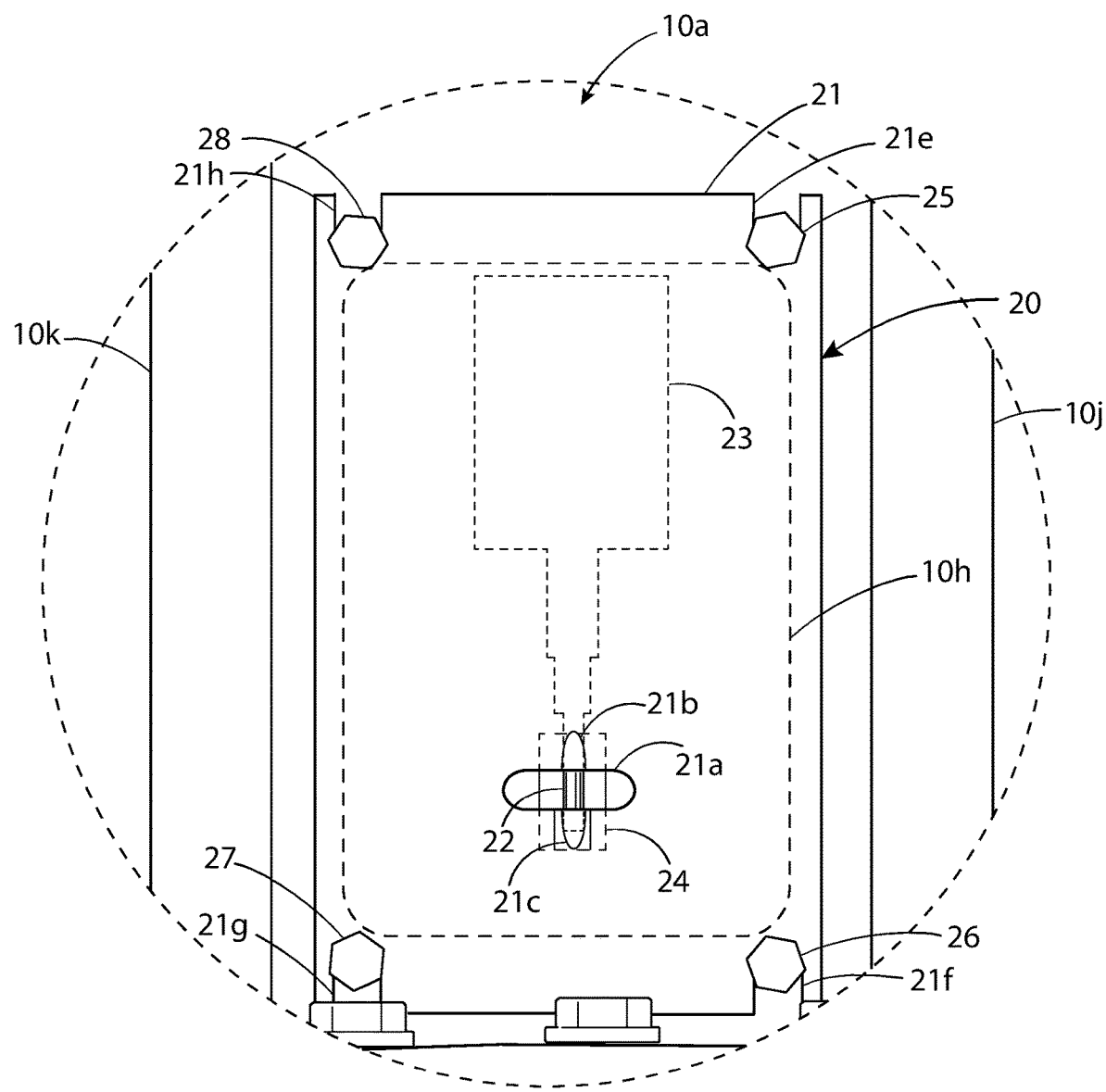
FIG. 7 illustrates, a detail view of a portion of FIG. 5 showing the log wrapper securement device with the rod extended into the slot to secure the chain link of the log wrapper; the actuator is shown in dashed lines indicating it is hidden behind the plate.
Figure 8:
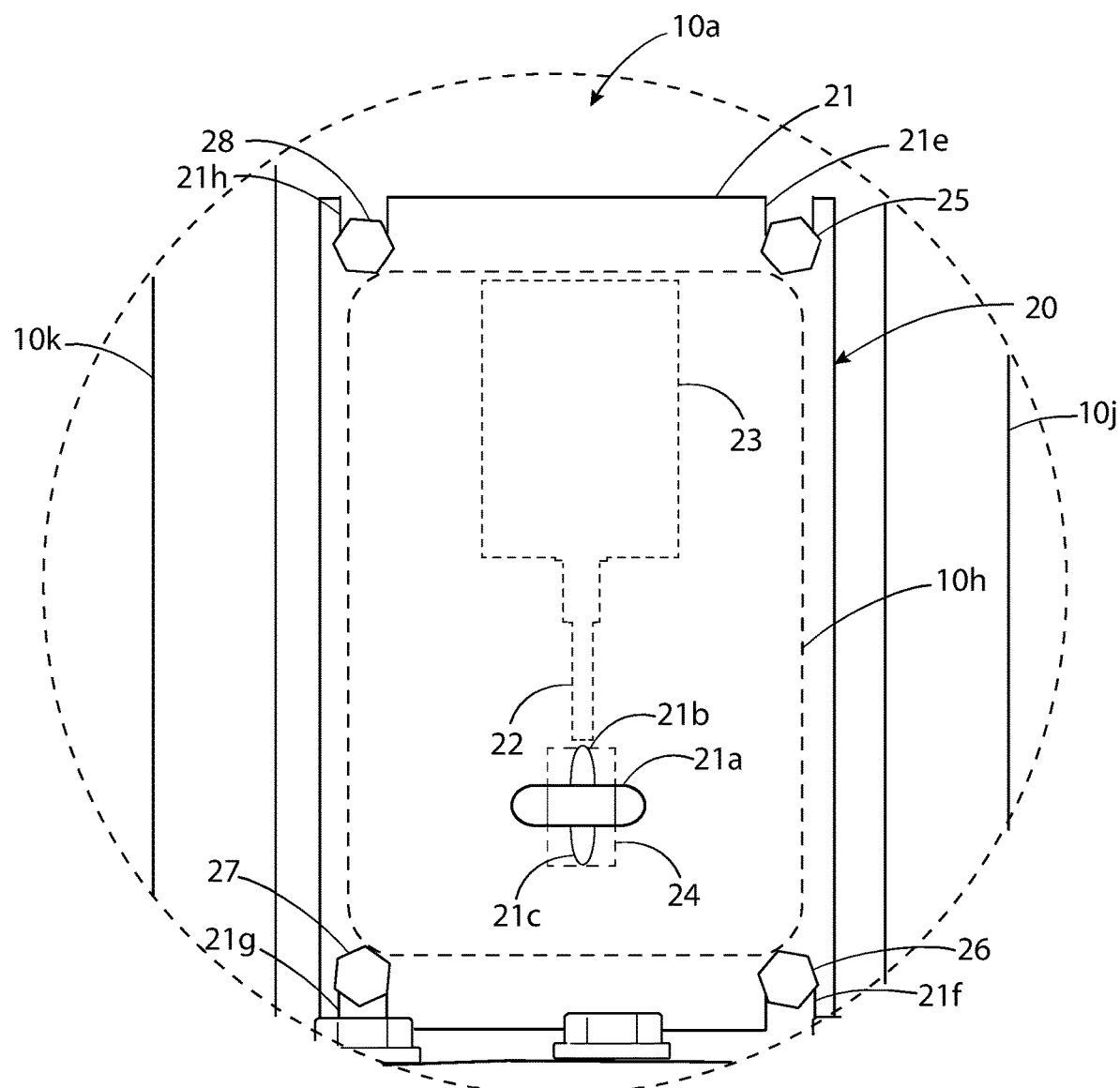
FIG. 8 illustrates, a detail view of a portion of FIG. 5 showing the log wrapper securement device with the rod retracted from the slot to allow insertion of the chain link of the log wrapper; the actuator is shown in dashed lines indicating it is hidden behind the plate.

Referring to FIGS. 7 and 8, which are an enlarged view of a portion of FIG. 5, to illustrate the log wrapper securement device 20 installed in the grapple head 10*a* and indented between the grapple head sides 10*j*, 10*k*. The log wrapper securement device 20 uses a rod 22 extending from a linear actuator 23 to engage a bracket 24 to catch and hold a chain end link 5*d* of the log wrapper 5 (FIG. 4). The linear actuator 23 and rod 22 are positioned behind the base plate 21 and within the inspection cavity 10*h*, with hidden portions represented by dashed lines. The base plate 21 includes a slot 21*a* that is sized and shaped to accept the chain end link 5*d* of the log wrapper 5 of FIG. 4. The slot 21*a* can optionally be sized and shaped to accept a chain link 5*f*, which can include the chain end link 5*d*, the second chain link 5*e* or other chain links of the log wrapper 5 of FIG. 4. The base plate 21 optionally includes first indent 21*b* and second indent 21*c* extending transversely from opposing lengthwise sides of the slot 21*a*. The purpose of the first indent 21*b* and the second indent 21*c* is to support a second chain link 5*e* as the chain end links 5*d* is inserted. The first indent 21*b* and the second indent 21*c* allow the chain end link 5*d* to be inserted more deeply into to the slot 21*a* as a portion of the second chain link 5*e* rests in the first indent 21*b* and the second indent 21*c*. The first indent 21*b* and the second indent 21*c* can alternatively be an indented surface surrounding the slot 21*a* or partially surrounding the slot 21*a* that is large enough to support the second chain link 5*e*. For example, the indented surface can be milled into the base plate above and below the slot 21*a* or surrounding the slot 21*a*. The indented surface can be routed or extruded across the base plate 21 over the slot 21*a*.

Figure 9:
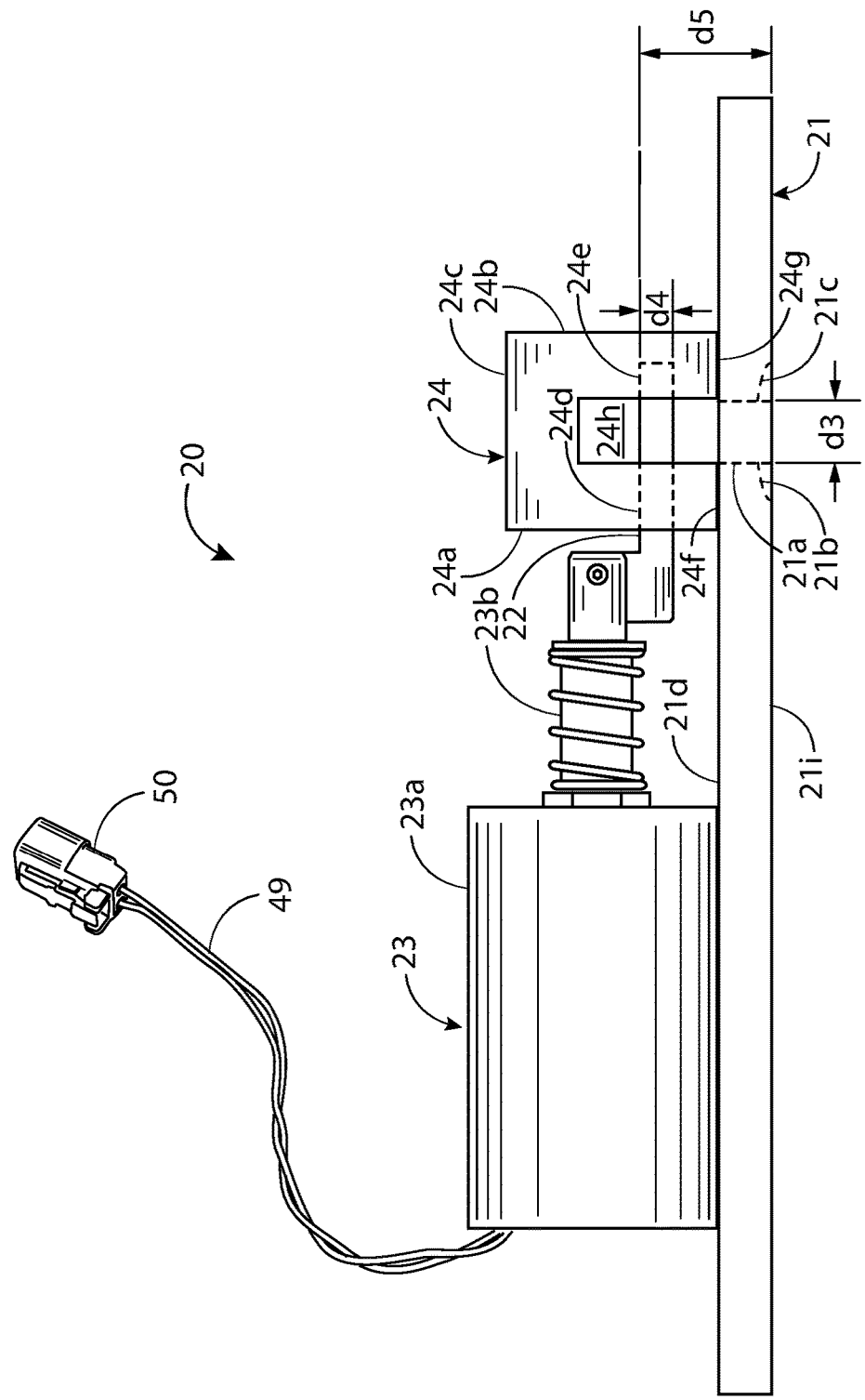
FIG. 9 illustrates in side elevation view, a log wrapper securement device of the present disclosure using an electrical solenoid as the linear actuator.
Figure 10:
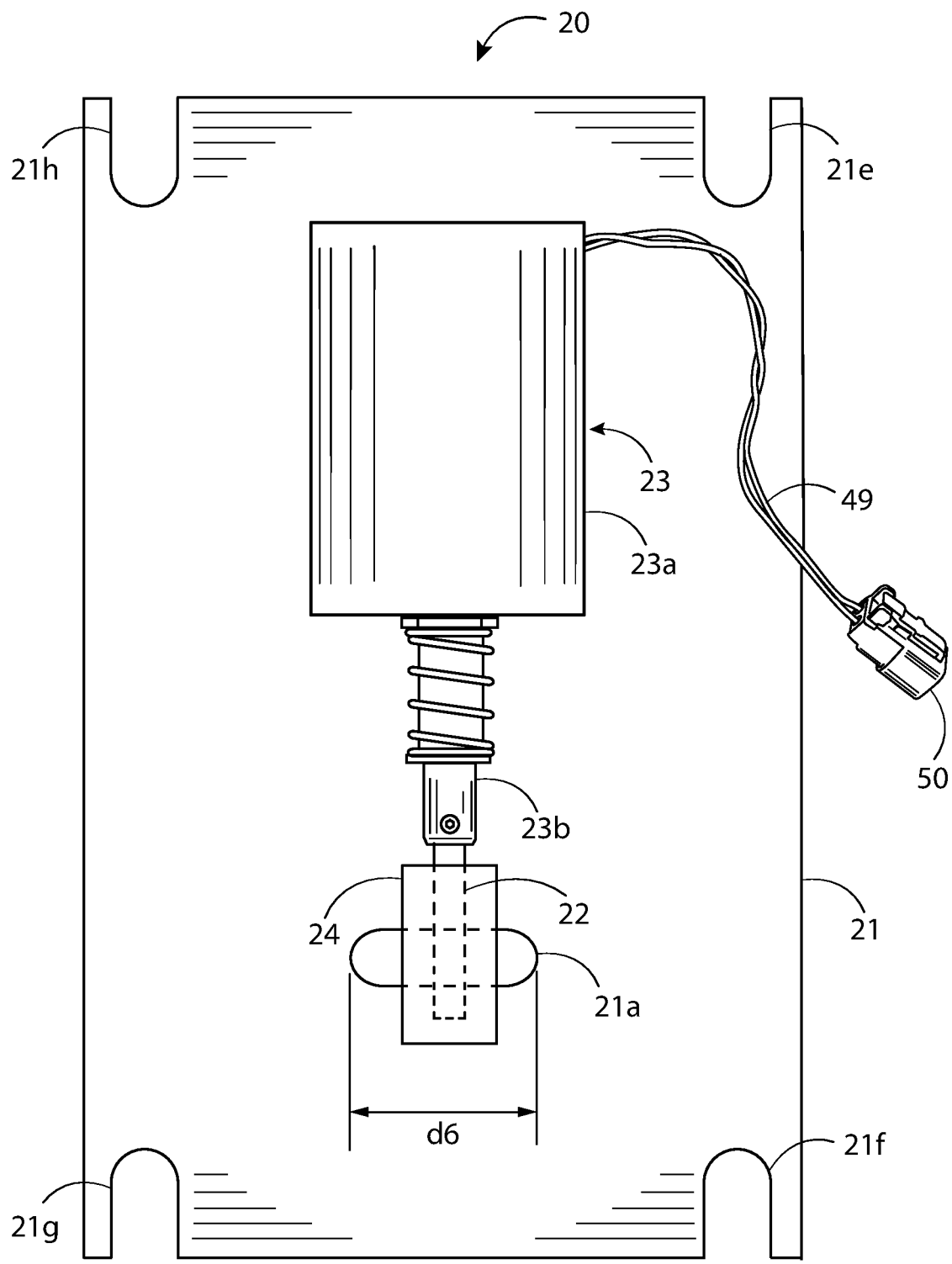
FIG. 10 illustrates in rear view, the log wrapper securement device of FIG. 9.
Figure 11:
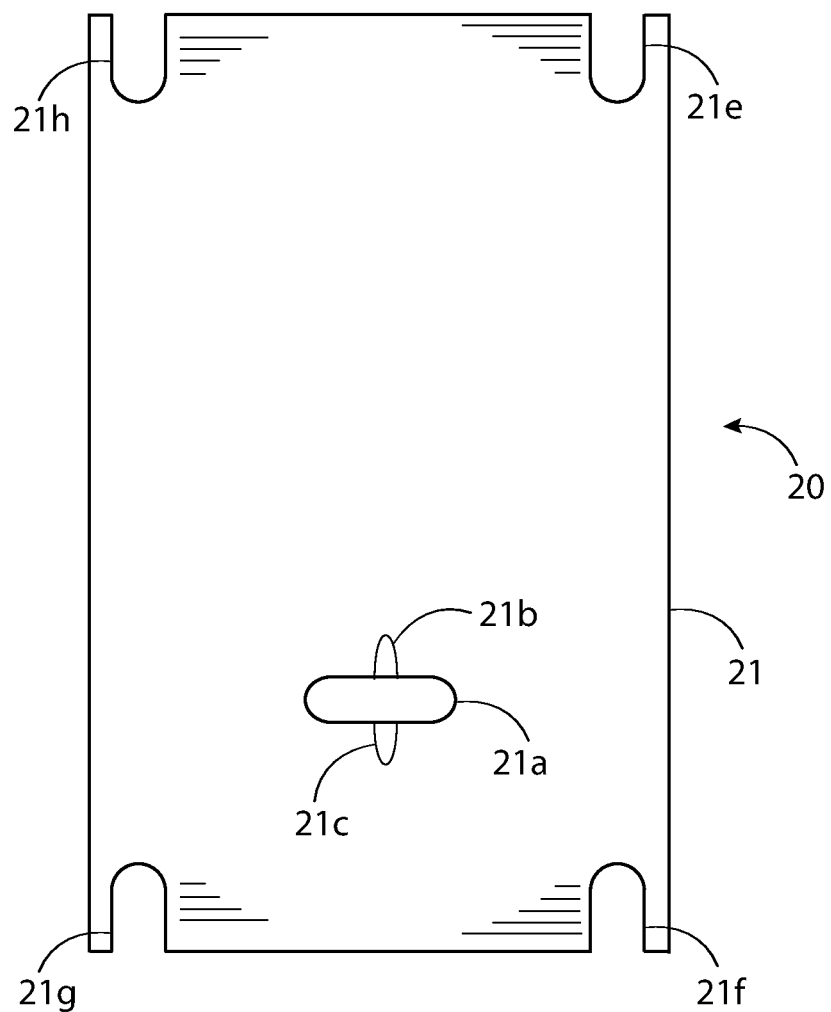
FIG. 11 illustrates in front view, the log wrapper securement device of FIG. 9.

FIG. 9 shows the log wrapper securement device 20 in side elevation view. FIG. 10 shows the log wrapper securement device 20 in rear view. FIG. 11 shows a front view (i.e., outside-facing view) of the log wrapper securement device 20. Referring to FIG. 9, the base plate includes a bottom surface 21*d*, a top surface 21*i*, with the slot 21*a* extending through the top surface and the bottom surface. The first indent 21*b* and the second indent 21*c* can optionally be indented in the top surface 21*i*. The first indent 21*b*, the second indent 21*c*, and the slot 21*a* are also illustrated in FIG. 11.

Referring to FIGS. 7-10, the linear actuator 23 extends and contracts the rod 22 across the length of the slot 21*a* (i.e., transverse to the length of the slot 21*a*) and through a bracket 24. The rod is illustrated as extended in FIGS. 7, 9, and 10 and contracted in FIG. 8. In the contracted position, chain end link 5*d*, or optionally the chain link 5*f*, both of FIG. 4, can be inserted in the slot 21*a*. In the extended position, the chain end link 5*d*, or chain link 5*f* is secured in place by the slot 21*a*, rod 22 and a bracket 24.

Referring to FIG. 9, the bracket 24, can be u-shaped with the u-shape formed by a first bracket arm 24*a*, a second bracket arm 24*b*, and a crossbar 24*c*. The portion between the first bracket arm 24*a*, the second bracket arm, and the crossbar 24*c* forming a bracket internal cavity 24*h*. The bracket internal cavity width is illustrated as approximately the slot width d3. This creates a guide structure for the chain end link 5*d* or chain link 5*f* of FIG. 17.

Figure 17:
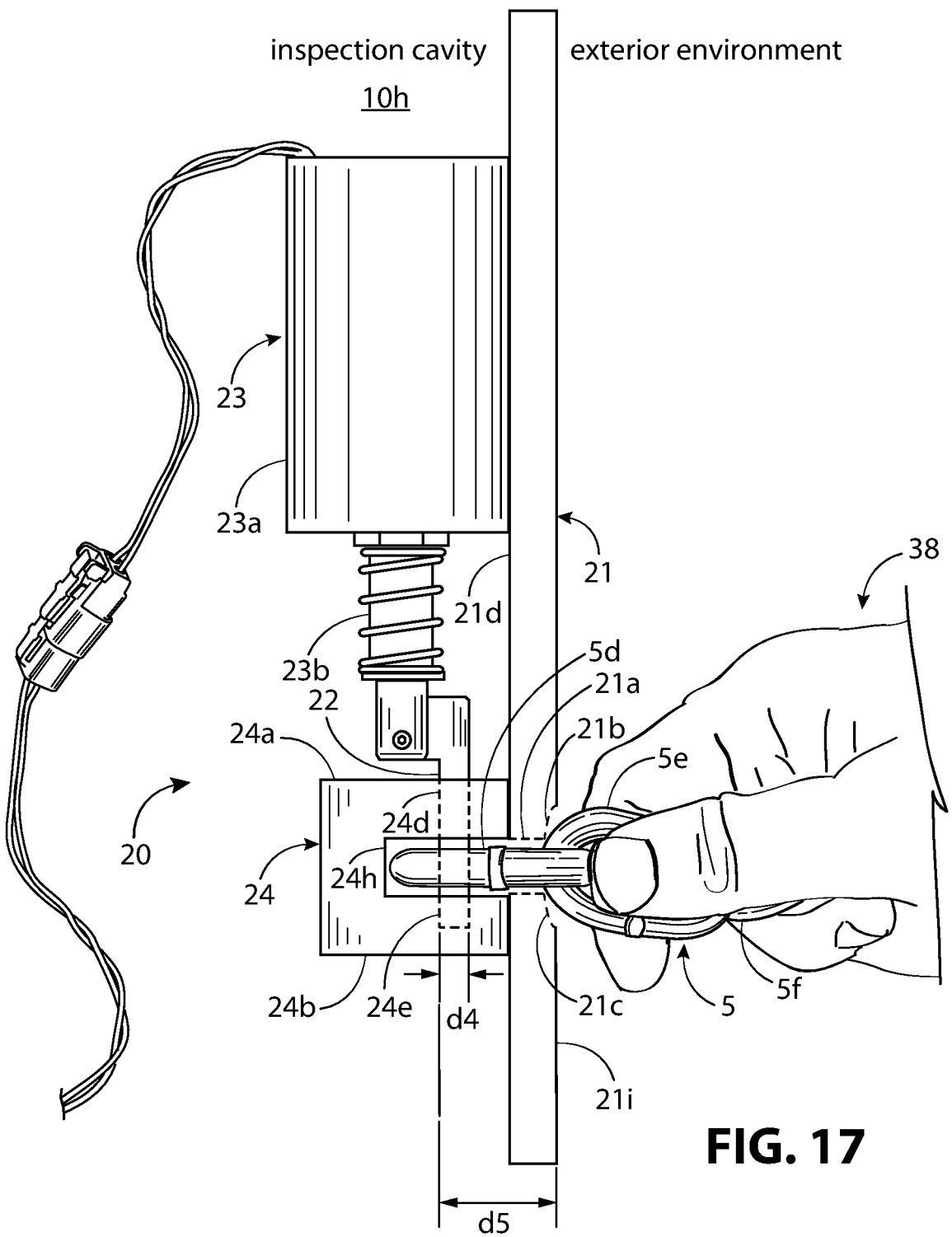
FIG. 17 illustrates the chain end link of the log wrapper being inserted into the slot of the log wrapper securement device in a simplified side cutaway view.

Referring to FIGS. 9 and 17, in the extended position, the rod 22 extends through a first aperture 24*d* in the first bracket arm 24*a* and into a second aperture 24*e* in the second bracket arm 24*b*. The second aperture 24*e* is illustrated as a blind hole because a blind hole provides a positive end stop for the rod 22. However, the second aperture can also be a through hole. The linear actuator body 23*a* and the bracket 24 can be secured to the bottom surface 21*d* of the base plate 21.

Referring to FIG. 9, the first bracket arm 24*a* and the second bracket arm 24*b* include bracket ends 24*f*, 24*g*, respectively. The bracket ends 24*f*, 24*g* can be secured by welding, adhesive, a threaded fastener, or any manner of securing that can withstand the day-to-day operation of a forestry grapple and log loader loading logs in commercial logging operations.

Referring to FIGS. 9 and 10, the linear actuator 23 is illustrated with an actuator arm 23*b* extending from the linear actuator body 23*a*. The actuator arm 23*b* extends or retracts depending whether or not electrical voltage is applied to the linear actuator 23. The rod 22 can be an independent element from the actuator arm 23*b* or can be integral with the actuator arm 23*b*. In FIGS. 9 and 17, the rod 22 is illustrated as an independent element and offset closer to the base plate 21 to accommodate various chain thicknesses. Within the meaning of this disclosure, when the actuator arm 23*b* is used by itself, rod 22 and actuator arm 23*b* can be used interchangeably. For instance, depending on the construction of the linear actuator 23, the rod might not need to be independent of the actuator arm 23*b* and the actuator arm may be used as the rod 22.

Referring to FIGS. 9 and 17, the rod 22 is illustrated as a separate element and shown offset below the actuator arm 23*b* and positioned at a height d5 with respect to the top surface 21*i* of the base plate 21 and with a diameter d4. The rod 22 can be joined to the actuator arm by any method that creates a strong enough joint to withstand the day-to-day operations in a commercial logging environment. For example, welding the element together or joining the elements with a threaded fastener. The height d5 and diameter d4 are such as to allow the rod 22 to pass through the chain end link 5d (FIG. 17). For example, for a chain end link 5d (FIG. 17) of 5/16 inches (0.0079 meters) diameter, chain opening length of approximately 1¼ inches (0.032 meters), and accounting for the thickness of the second chain link 5e, the height d5 should be less than 15/16 inches (0.024 meters). The diameter d4 of the rod 22 should be smaller than the chain opening width to fit into the chain link. It should also allow for clearance between the chain opening length and the thickness of the base plate 21. Assuming the thickness of the base plate 21 is 3/8 inches (0.0095 meter), and the chain link interior width is 7/16 inches (0.011 meters), the diameter d4 of the rod 22 should typically be less than 7/16 inches (0.011 meters). The slot length d6 should be at least 1⅛ inches to accommodate the width of the chain end link 5d. To accommodate other size chains, such as 3/8-inch (0.0095 meter) chains, the diameter d4, height d5, and slot length d6 (FIG. 9) should be adjusted accordingly. Referring to FIG. 17, optionally, adding the first indent 21b and the second indent 21c in the top surface 21i allows the chain end link 5d to be inserted more deeply within the bracket internal cavity 24h because a portion of the second chain link 5e rests in the slot 21a, first indent 21b, and the second indent 21c below the top surface 21i.

Referring to FIGS. 5 and 17, to accommodate a chain link 5f including the chain end link 5d and other chain links of the log wrapper 5, the height d5 and diameter d4 may need to be adjusted to accommodate the smaller chain opening in any link other than the chain end link 5d. Referring to FIG. 17, this is because the two chain links adjacent to the chain link 5f will typically be positioned side-by-side in order to insert the chain link 5f into the slot 21a. Since the adjacent links reside on a curved surface either one or both would tend to impinge on the chain link opening more than if there were only one adjacent chain link. Therefore height d5 and diameter d4 would need to be adjusted to compensate for this.

Figure 12:
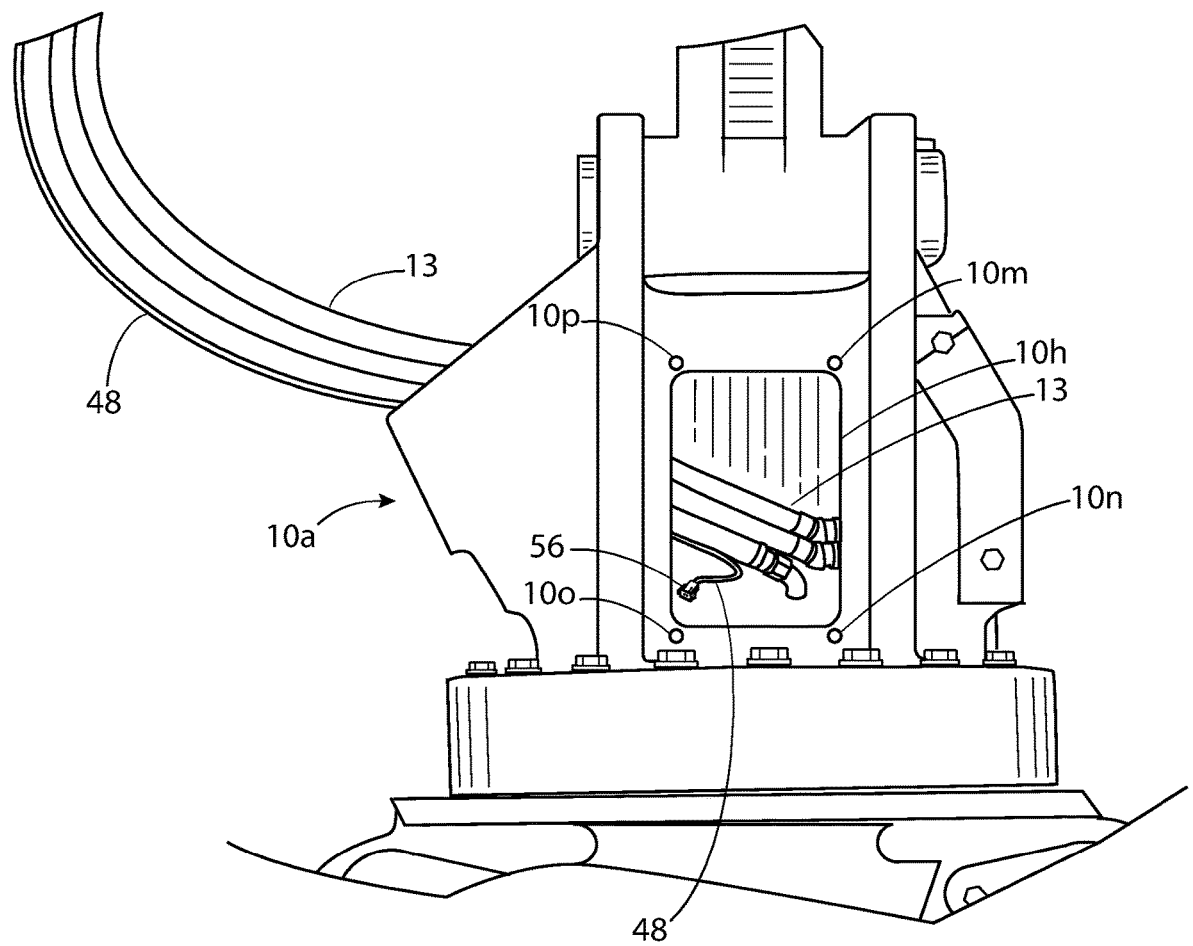
FIG. 12 illustrates the inspective cavity of the forestry grapple.

Referring to FIGS. 7, 8, 10, and 11, the base plate 21 includes fastener-receiving apertures 21e, 21f, 21g, 21h. Referring to FIGS. 7, 8, and 12, the fastener-receiving apertures 21e, 21f, 21g, 21h (FIGS. 7 and 8) are sized and shaped to receive and passthrough portions of the threaded fasteners 25, 26, 27, 28 (FIGS. 7 and 8) into threaded apertures 10m, 10n, 10o, 10p (FIG. 12) in a portion of the grapple head 10a (FIG. 12) surrounding the inspection cavity 10h. Referring to FIGS. 10 and 11, the fastener-receiving apertures 21e, 21f, 21g, 21h are illustrated as slotted. This allows the log wrapper securement device 20 to accommodate forestry grapples from different manufacturers since the placement of the threaded apertures 10m, 10n, 10o, 10p of FIG. 12 may vary. Alternatively, the apertures can be circular apertures and positioned to accommodate specific forestry grapple models and manufacturers.

Figure 13:
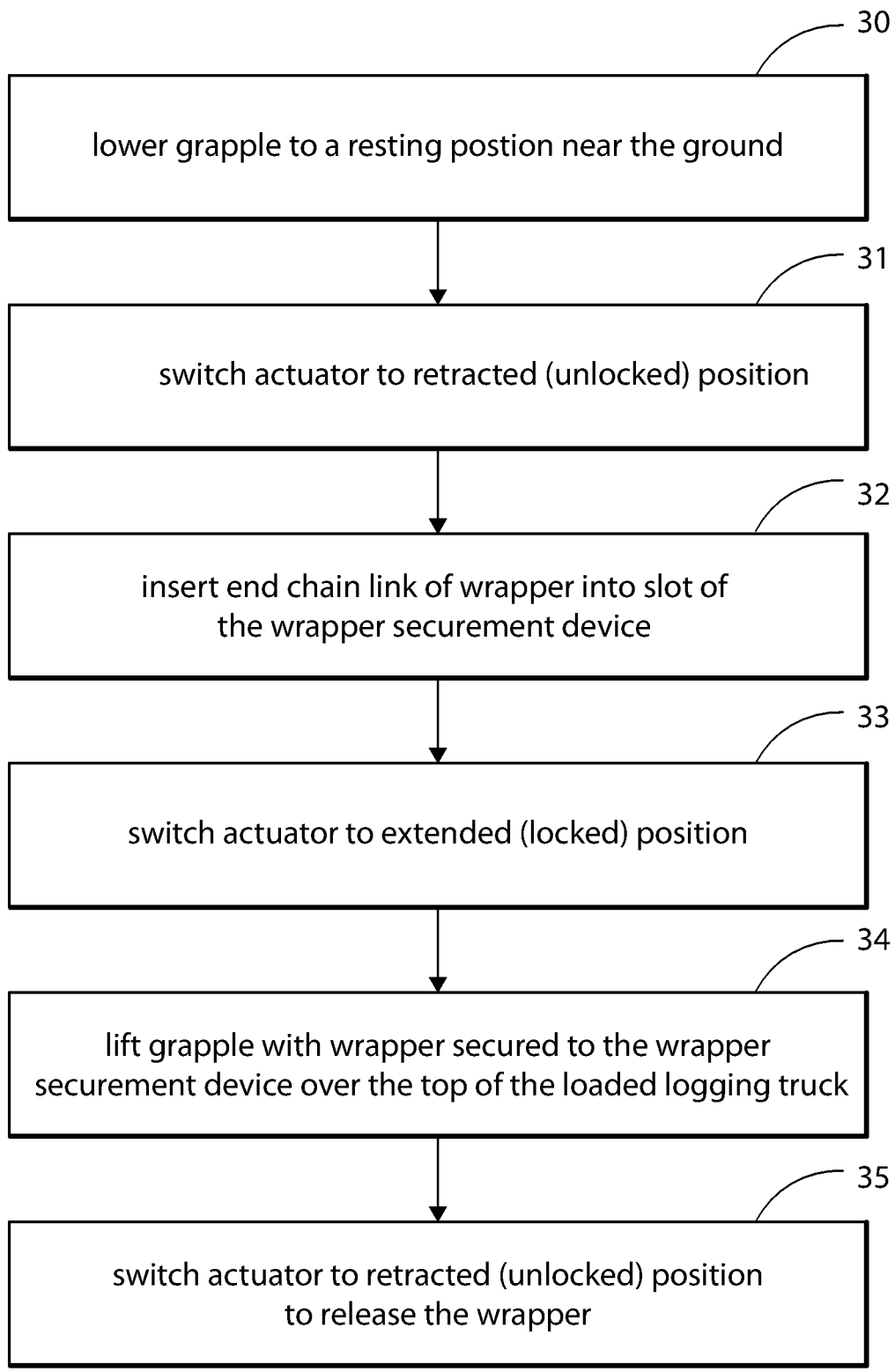
FIG. 13 illustrates a flow chart using the log wrapper securement device to secure, lift, and release the log wrapper over the loaded logging truck.

FIGS. 14, and 16-19 demonstrate the log wrapper securement device 20 in use with FIG. 13 summarizing the method of placing the log wrapper 5 (FIGS. 14, and 16-19) with a chain end link 5d (FIG. 17) over a logging truck 1 (FIGS. 14, 18, and 19). Referring to FIGS. 13 and 14, in step 30, the loader operator 37 places the forestry grapple 10 in a stationary position near or on the ground by lowering the boom 9 and adjusting the forestry grapple 10. FIG. 14 illustrates the forestry grapple 10 resting in the stationary position. The forestry grapple 10 is optionally retracted in the heel 11. This helps to keep the logging truck driver 38 out of harm's way because of the moving parts of the forestry grapple 10 are shrouded by the heel 11. In addition, retracting the forestry grapple 10 into the heel 11 helps prevent the log wrapper 5 from being caught and damaged by moving parts in the forestry grapple 10 since the forestry grapple 10 remains stationary with respect to the heel 11.

Figure 15:
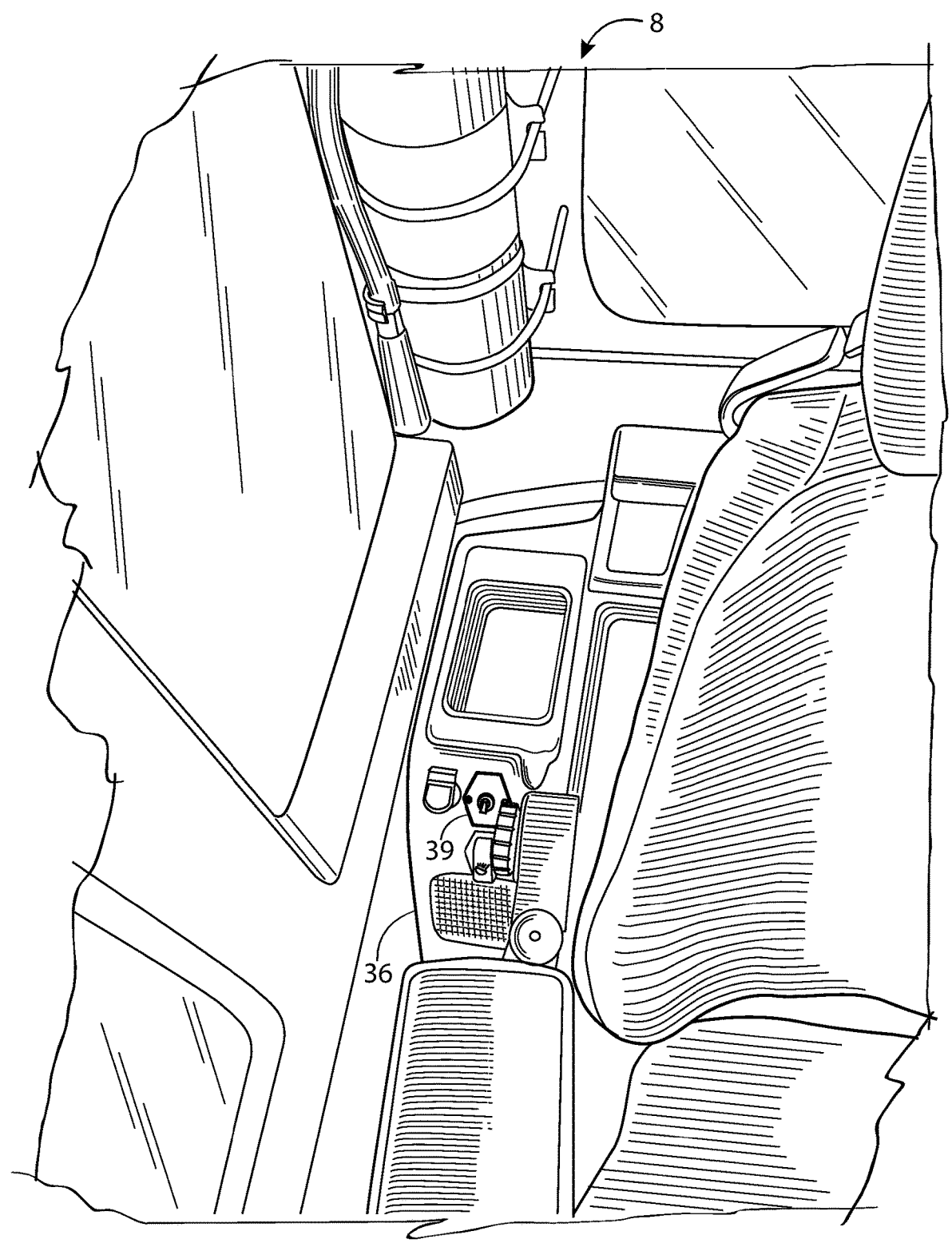
FIG. 15 illustrates an inside view of the log loader cab showing the actuator control mounted to the console.
Figure 16:
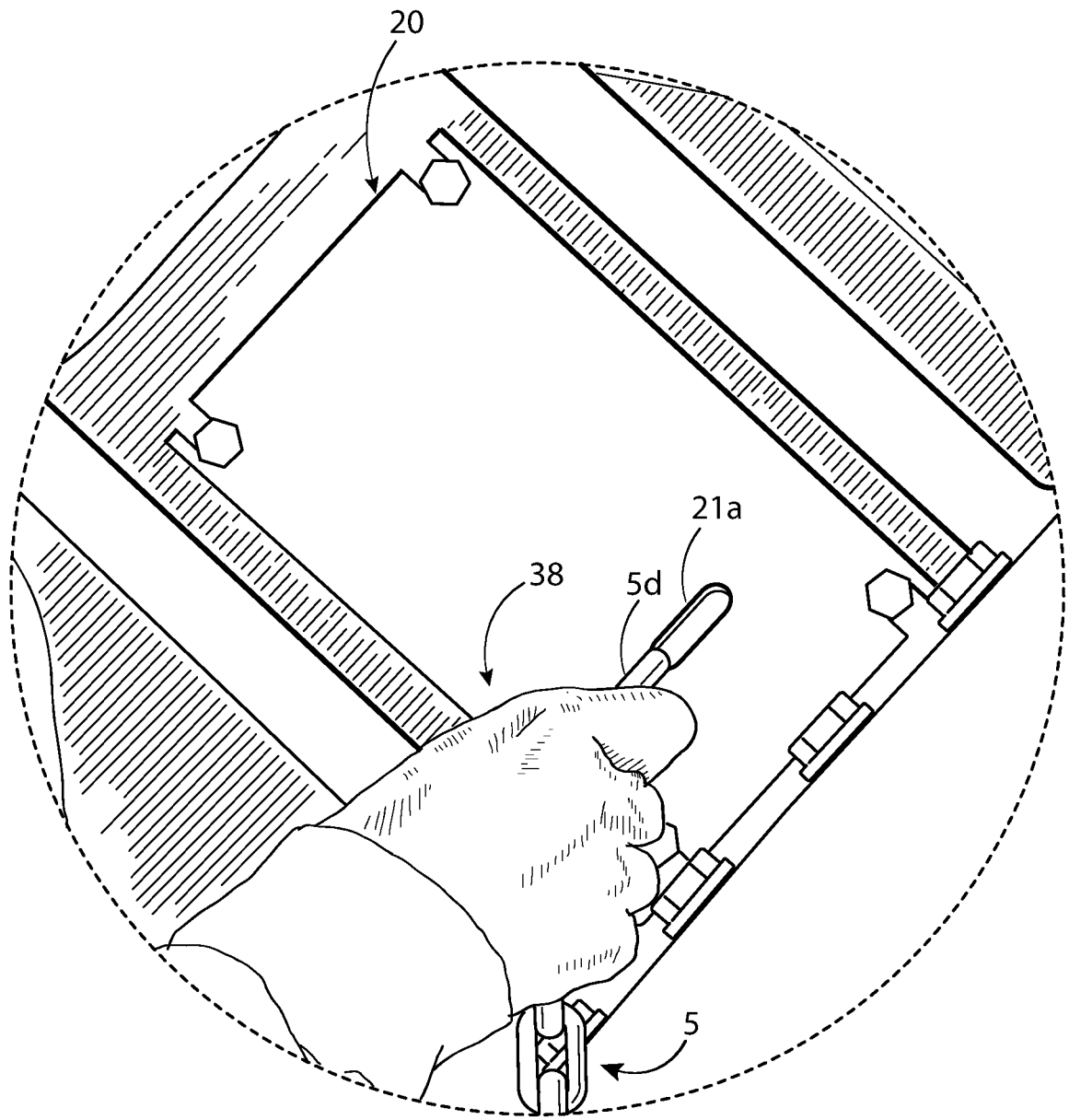
FIG. 16 illustrates a detail view of a portion of FIG. 14, illustrating the logging truck operator inserting the last chain link of the log wrapper into the slot.

In step 31, the loader operator 37 remotely switches the actuator to an unlocked position. Referring to FIG. 15, which shows a view inside the cab 8 of the log loader 7 of FIG. 14, the actuator control 39 can be integrated in the cab 8. For example, the actuator control 39 can be integrated in the console 36 of the cab 8. In FIGS. 13 and 14, in step 32, the logging truck driver 38 approaches the forestry grapple 10. In FIGS. 13, 16, and 17 the logging truck driver 38 places the chain end link 5d of the log wrapper 5 inside the slot 21a of the log wrapper securement device 20. FIG. 17 shows a simplified cutaway view showing the linear actuator 23, rod 22, and the bracket 24, inside the inspection cavity 10h in a protected environment with the chain end link 5d being inserted by the logging truck driver 38 in the exterior environment.

Referring to FIGS. 13 and 14, in step 33, the logging truck driver 38 signals the loader operator 37. Referring to FIGS. 14-17, the loader operator 37 (FIG. 14) activates and engages the actuator control 39 (FIG. 15), so that the linear actuator 23 (FIG. 17) extends the rod 22 (FIG. 17) through the chain end link 5d (FIGS. 16 and 17). Referring to FIG. 14, if the log wrapper securement device 20 is capable of securing more than one of the log wrappers 5, the logging truck driver 38 and loader operator 37 repeat the steps 31, 32, 33 for the other of the log wrappers 5. One of the advantages of the log wrapper securement device 20 is that the base plate 21 covers the linear actuator 23 and rod 22 except where the slot 21a is. The slot 21a can be sized so that the hands and fingers of the logging truck driver 38 are shielded from rod 22 and actuator arm 23b as they move. This prevents potential injuries while using the log wrapper securement device 20.

Referring to FIGS. 13 and 18, once the log wrapper 5 is secured to the log wrapper securement device 20, in step 34, the logging truck driver 38 steps away from the log loader 7, forestry grapple 10, and boom 9, and out of harm's way. Once the logging truck driver 38 is out of harm's way, referring to FIGS. 13 and 19, the loader operator 37 (not shown) lifts the forestry grapple 10, with the log wrapper 5 secured to the log wrapper securement device 20, and moves it over the top of the logs 6. Once the forestry grapple is in position, the loader operator 37 releases the log wrapper 5 from the log wrapper securement device 20 via remote control. The rod 22 is retracted by the linear actuator 23 and this releases the chain end link 5d (FIG. 17). In step 35, once the forestry grapple 10 and log wrapper 5 are positioned on the other side of the logs 6, the loader operator 37 (not shown) retracts the rod 22 of FIG. 17 using the actuator switch of FIG. 15, and releases the log wrapper 5.

The log wrapper securement device 20 and the described method have several advantages. First, the logging truck driver 38 of FIGS. 14 and 18 does not have to be in harm's way. As discussed for FIG. 14, the forestry grapple 10 is stationary while the log wrapper 5 is being secured to the log wrapper securement device 20. Second, the repetitive stress injury from throwing is eliminated. There is no throwing involved, and the operation does not depend on throwing the log wrapper 5 onto a moving target. Third, whether or not the forestry grapple 10 is retracted into the heel 11, as illustrated in FIGS. 14, 18, and 19, the risk of damaging the log wrapper 5 is greatly reduced because the log wrapper 5 is secured to an area of the forestry grapple which is out of the way of moving parts. The grapple arms 10c can remain stationary while the log wrapper 5 is lifted and released by the log loader 7. Fourth, the log wrapper securement device 20 can be constructed to lift more than one of the log wrappers 5 thereby increasing efficiency.

Figure 20:
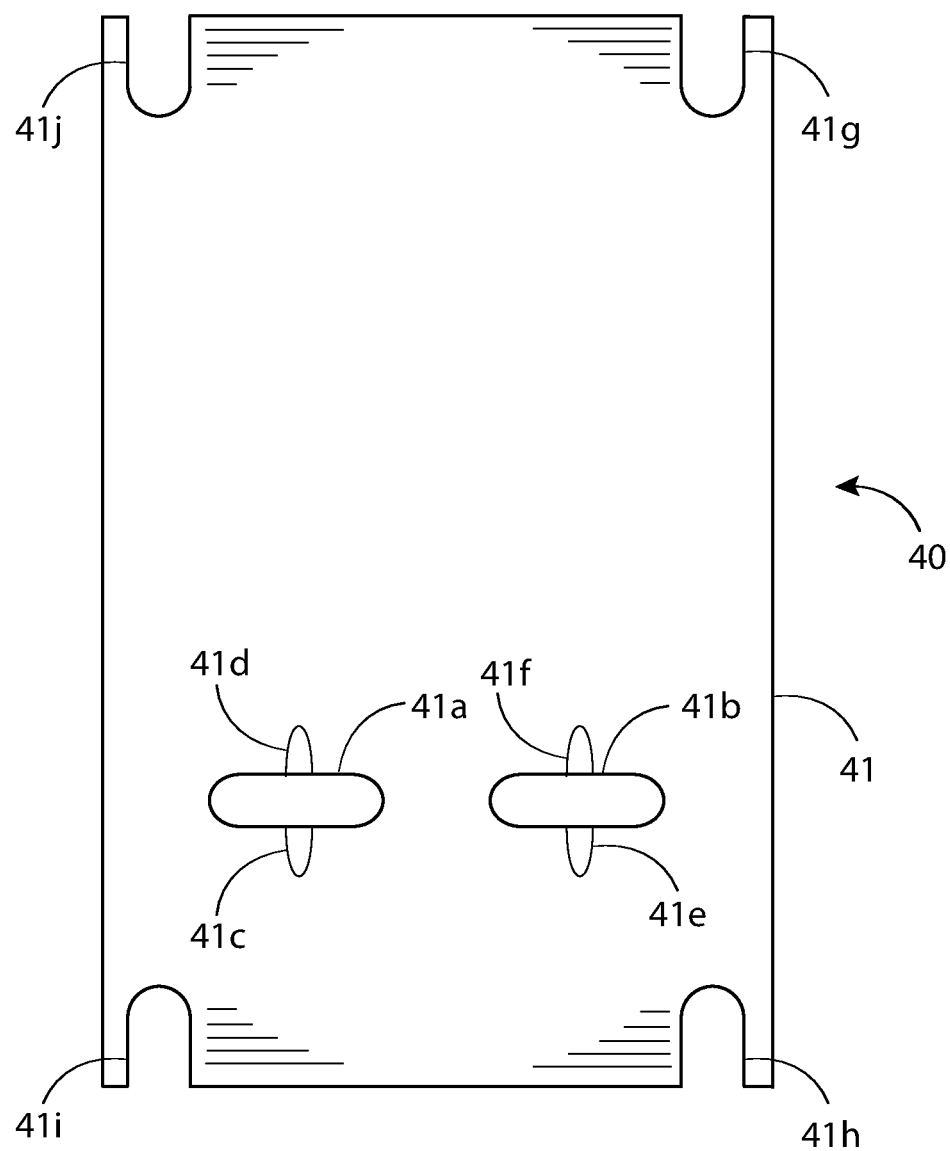
FIG. 20 illustrates in front view, a dual-actuator version of the log wrapper securement device.
Figure 21:
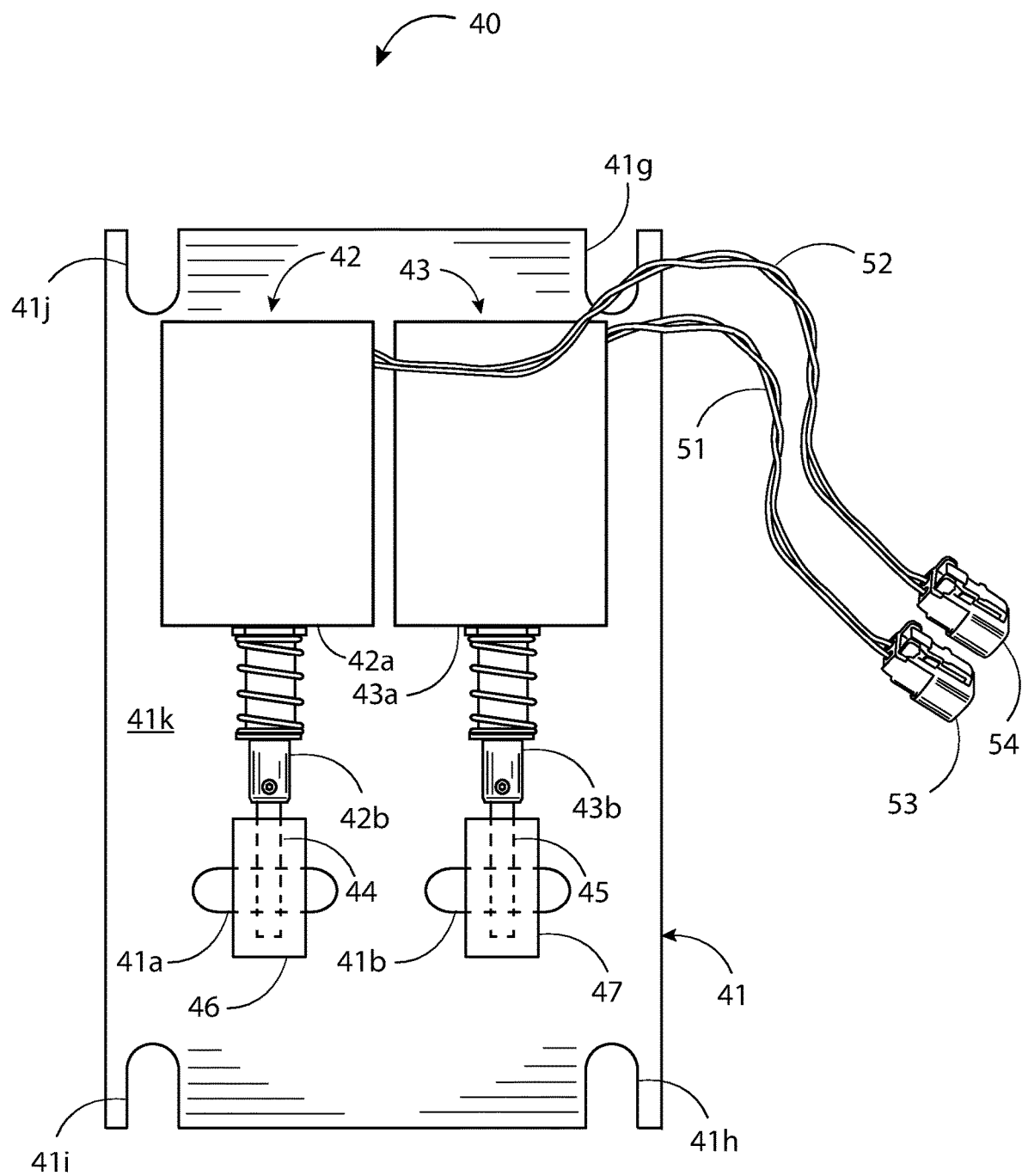
FIG. 21 illustrates a rear view of the log wrapper securement device of FIG. 21.

FIGS. 20 and 21 illustrate a log wrapper securement device 40 designed to engage more than one of the log wrappers 5. The log wrapper securement device 40 includes slots 41a, 41b in the base plate 41, each sized and shaped to receive and guide the chain end link 5d of FIG. 17. Referring to FIG. 20, the indents 41c, 41d can optionally be positioned across the slot 41a. Indents 41e, 41f can optionally be positioned across the slot 41b. These optional indents can be used to help guide and position the second chain link 5e of FIG. 17 as previously described. Referring to FIGS. 12, 20, and 21, the fastener-receiving apertures 41g, 41h, 41i, 41j (FIGS. 20 and 21) are sized and shaped to receive and passthrough portions of threaded fasteners such as the threaded fasteners 25, 26, 27, 28 of FIG. 7 into threaded apertures 10m, 10n, 10o, 10p (FIG. 12) in a portion of the grapple head 10a (FIG. 12) surrounding the inspection cavity 10h (FIG. 12). Referring to FIGS. 20 and 21, the fastener-receiving apertures 41g, 41h, 41i, 41j are illustrated as slotted. This allows the log wrapper securement device 40 to accommodate forestry grapples from different manufacturers since the placement of the threaded apertures 10m, 10n, 10o, 10p of FIG. 12 may vary. Alternatively, the fastener-receiving apertures 41g, 41h, 41i, 41j can be circular apertures or other shapes, and positioned to accommodate specific forestry grapple models and manufacturers.

Referring to FIG. 21, the log wrapper securement device 40 includes linear actuators 42, 43, rods 44, 45, and brackets 46, 47. The linear actuator 42, 43 can include linear actuator bodies 42a, 43a and linear actuator arms 42b, 43b, respectively. The linear actuators 42, 43, linear actuator bodies 42a, 43a, linear actuator arms 42b, 43b, rods 44, 45, and brackets 46, 47 can function in a similar manner as described for FIGS. 9 and 10. For example, the linear actuator 42 can extend and contract the rod 44 across the length of the slot 41a and through a bracket 46. The linear actuator 43 can extend and contract the rod 45 across the length of the slot 41b and through a bracket 47. The linear actuators 42, 43, can be controlled together by one actuator control (actuator control 39 of FIG. 15, for example) or can be controlled separately by separate actuator controls. The brackets 46, 47 can be u-shaped. For example, as described, the bracket 24 in FIG. 9 with two bracket arms extending from the ends of a crossbar. The brackets 24 can be other shapes as described in other sections of this disclosure. The linear actuators 42, 43 and the brackets 46, 47 can be secured to the inside-facing surface 41k of the base plate 41. The brackets 46, 47 can be secured to the inside-facing surface 41k by welding, adhesive, a threaded fastener, a strap, a cradle, a bracket, or any manner of securing that can withstand the day-to-day operations of a forestry grapple and log loader used in commercial logging operations.

The linear actuator 23 of FIGS. 7-10 and the linear actuators 42, 43 of FIG. 21 are illustrated as linear electric actuators, such as linear solenoids. Referring to FIG. 15, the actuator control 39 can be, for example, an electrical switch or an electrical switch coupled to an electronic circuit board. Referring to FIG. 12, the actuator control line 48, in the form of an electrical cable, that feed the linear actuators 23 of FIGS. 7-10 and the linear actuators 42, 43 of FIG. 21 can be bundled with the hydraulic hoses 13 and routed into the inspection cavity 10h. This actuator control line 48 can carry control signals or control voltages from the actuator control 39 of FIG. 15 to the linear actuator 23 of FIGS. 7-10 or the linear actuators 42, 43 of FIG. 21. Referring to FIGS. 9 and 10, the linear actuator 23 has electrical wires 49 that connect to the actuator control line 48 and electrical connector 56 of FIG. 12 by an electrical connector 50, as illustrated. In FIG. 21, the linear actuators 42, 43, have electrical wires 51, 52, with electrical connectors 53, 54, respectively that can similarly connect to control wires and connectors from the actuator control line 48 of FIG. 12. The electrical connections can alternatively be made by wire nuts, soldering, bus bars, or other electrical connecting structures that can withstand the day-to-day operation of the log loader 7 of FIG. 14 in a commercial logging operation.

Figure 22:
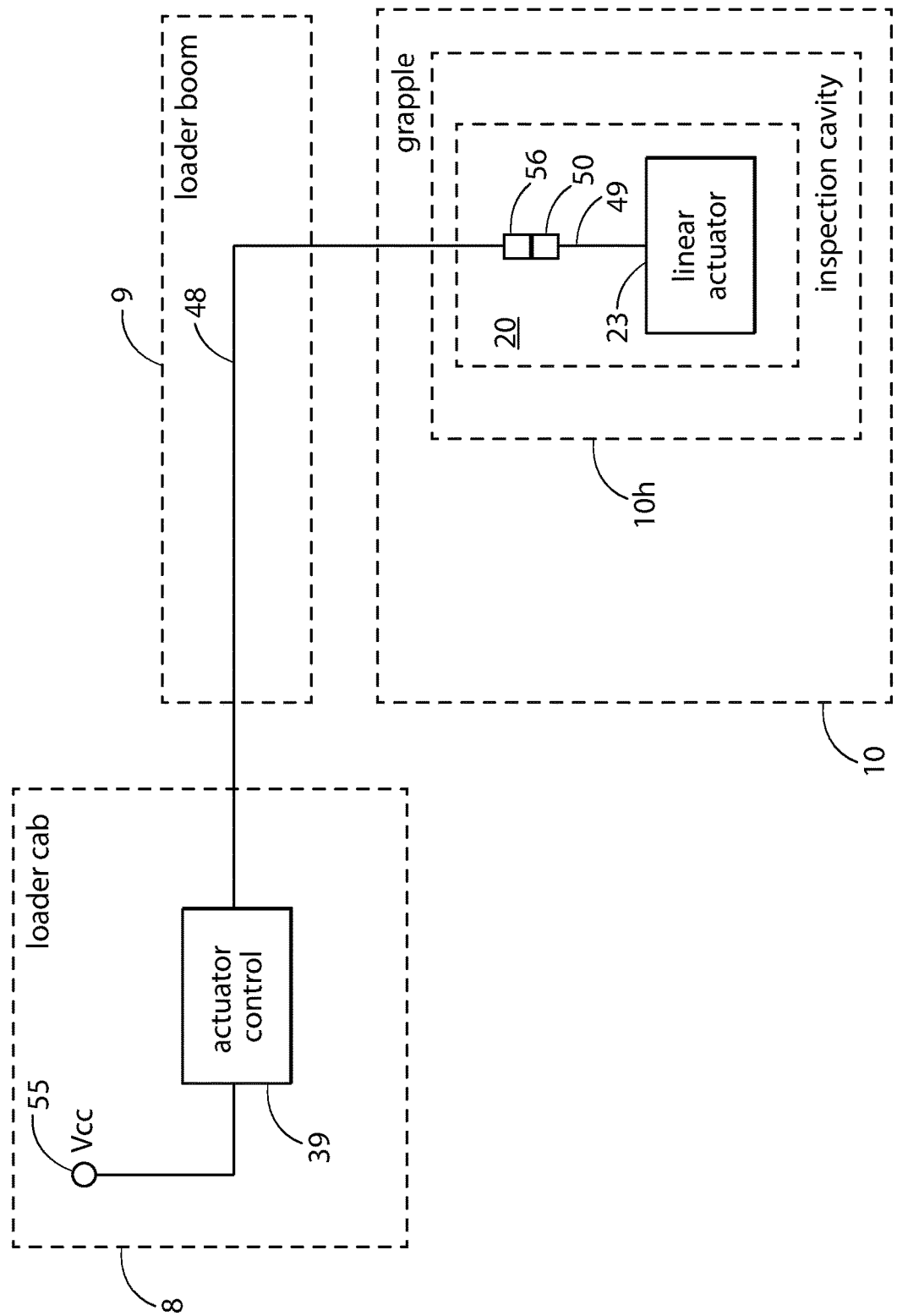
FIG. 22 illustrates a typical electrical diagram of the log wrapper securement device integrated into a log loader.

FIG. 22 illustrates a typical electrical connection diagram. The actuator control 39, located in the cab 8 is connected to a power supply 55 marked Vcc. The power supply 55 can be log loader provided power, which is typically 24 volts DC. The actuator control 39 can be an electrical switch, such as the electrical toggle switch illustrated in FIG. 15. The actuator control 39 can include a circuit board with other circuitry, such as LED lights to indicate whether the log wrapper securement device 20 is activated or deactivated (i.e., locked or unlocked). The actuator control 39 can be a control module with a processor, microcontroller, or equivalent circuitry. A physical switch or other physical control can trigger the control module. Alternatively, the control module can include a graphical user interface with a virtual control. The control module can include a wireless transmitter or receiver that allows for virtual control from a mobile device such as a cell phone or tablet. The wireless transmitter or receiver can be, for example, 802.11, Bluetooth, by mobile carrier, or other wireless transmission protocols.

The output of the actuator control 39 can feed the actuator control line 48. The actuator control line 48 can be routed along the boom 9 and into the inspection cavity 10h of the forestry grapple 10 with the hydraulic hoses 13 of FIGS. 5 and 6 that control the forestry grapple 10. The actuator control line 48 can then be connected to the linear actuator 23 within the log wrapper securement device 20 as previously described. For example, by electrical connectors 50, 56 to electrical wires 49 that feed the linear actuator 23.

Figure 23:
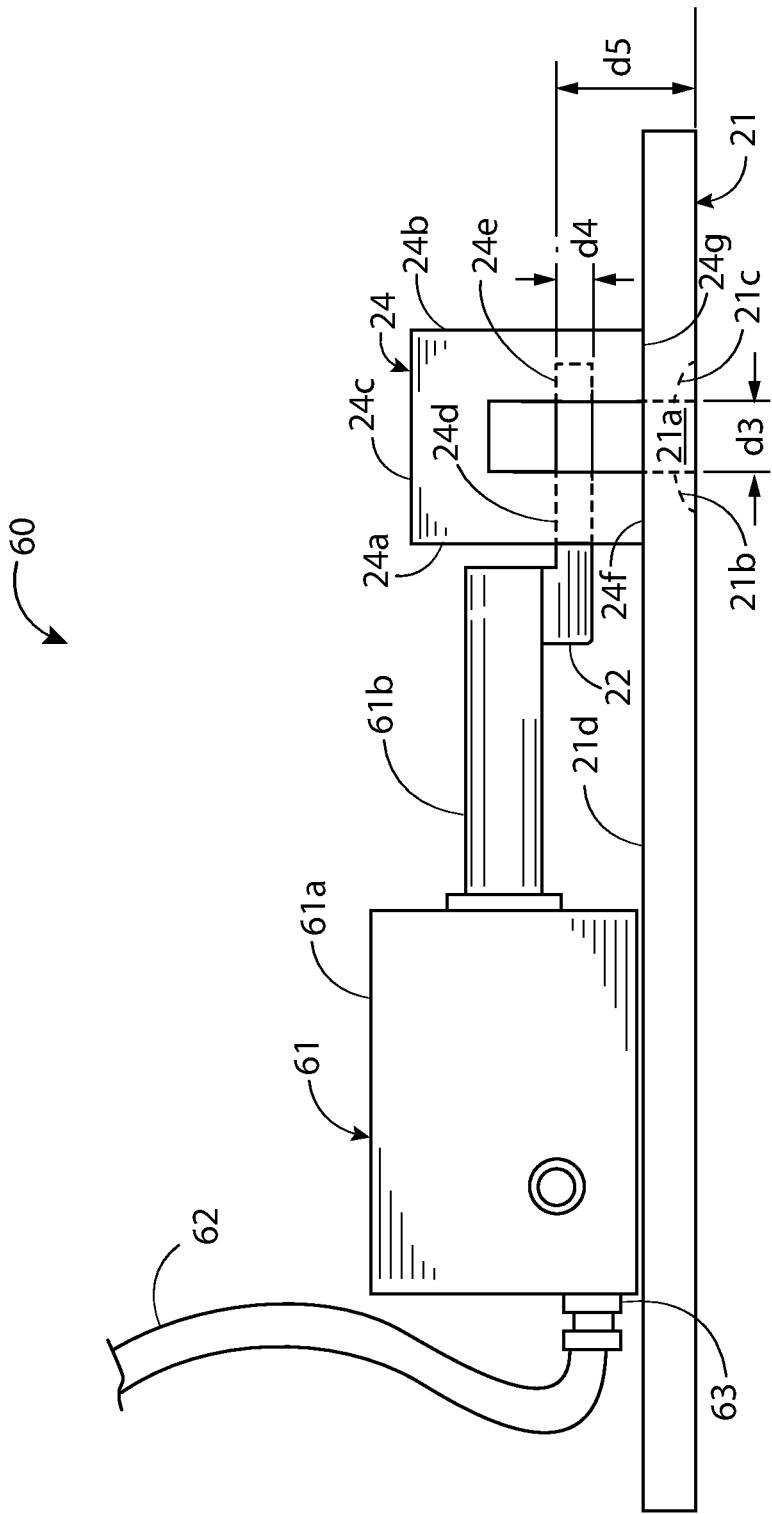
FIG. 23 illustrates in side elevation view, a log wrapper securement device of the present disclosure using a hydraulic actuator as the linear actuator.
Figure 24:
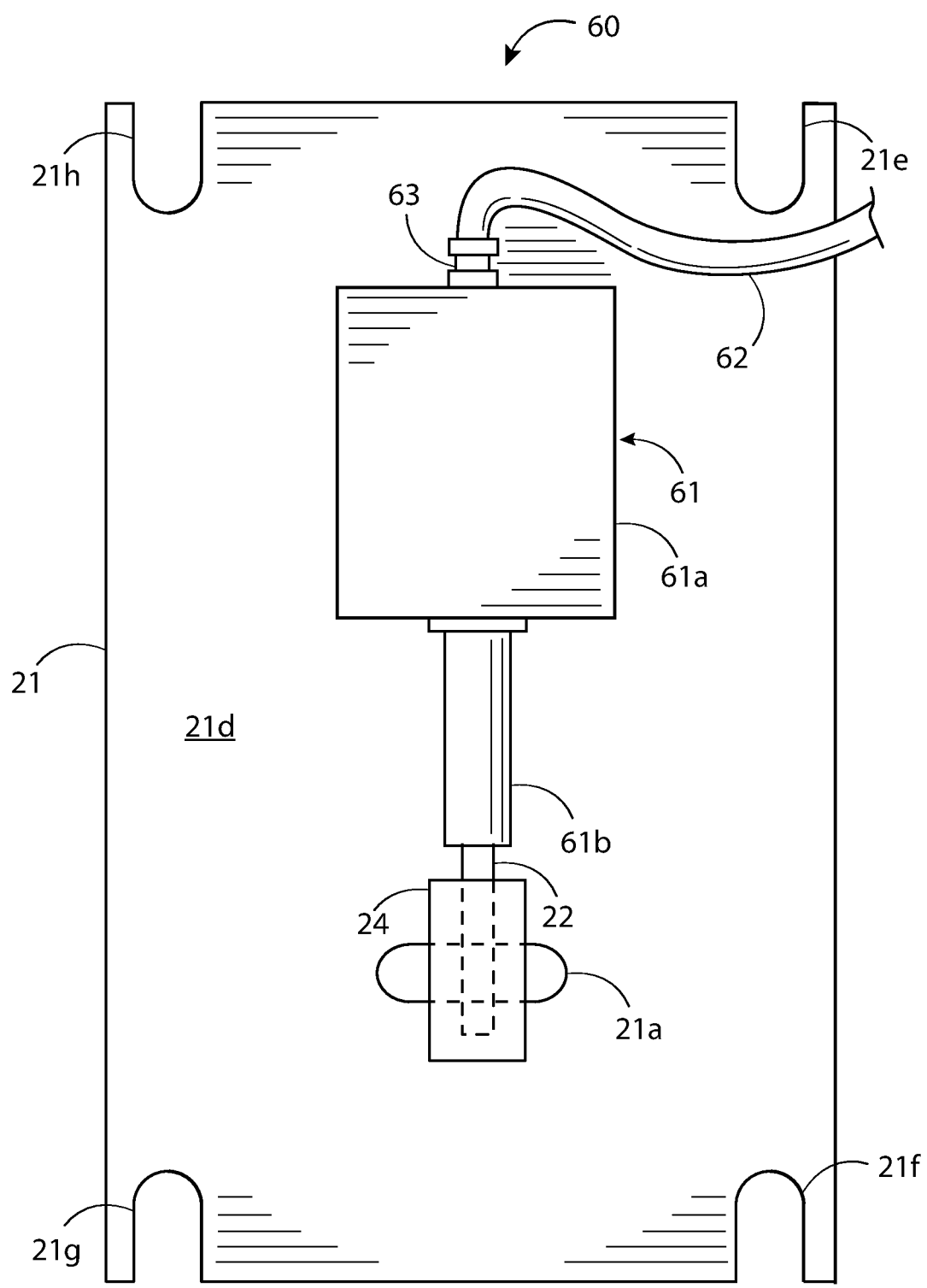
FIG. 24 illustrates in rear view, the log wrapper securement device of FIG. 23.
Figure 25:
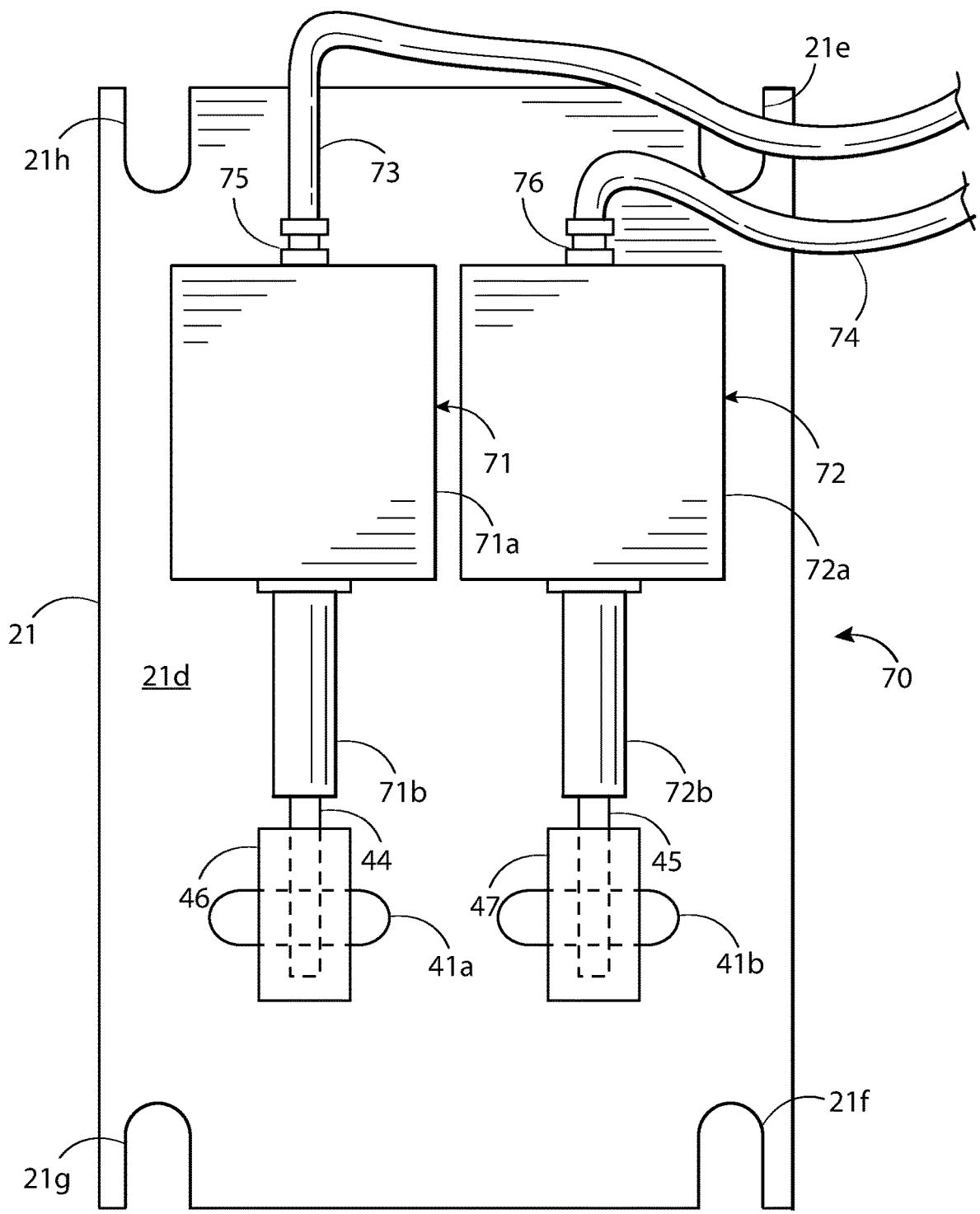
FIG. 25 illustrates in rear view, a log wrapper securement device of the present disclosure using two hydraulic actuators as the linear actuators.

FIGS. 23-26 illustrate log wrapper securement devices 60 (FIGS. 23, 24, 26) and log wrapper securement device 70 (FIG. 25) that utilizes hydraulic actuators. FIGS. 23 and 24 illustrate a log wrapper securement device 60 that includes a single hydraulic linear actuator: the linear actuator 61. FIG. 25 illustrates an example of a log wrapper securement device 70 with multiple hydraulic linear actuators: the linear actuators 71, 72. Referring to FIGS. 23 and 24, the linear actuator 61 includes an actuator body 61a and an actuator arm 61b that extends and retracts into the actuator body 61a depending on hydraulic fluid pressure through the actuator control line 62, in the form of a hydraulic control line. The actuator control line 62 can connect to the linear actuator 61 by a connector 63. Referring to FIG. 25, the linear actuators 71, 72 include actuator bodies 71a, 72a and actuator arms 71b, 72b, respectively. The actuator arms 71b, 72b extend and retract from the actuator body 71a, 72a depending on the hydraulic fluid pressure through the actuator control lines 73, 74, respectively. The actuator control lines 73, 74 can be connected the actuator bodies 71a, 72a by connectors 75, 76 respectively.

Referring to FIGS. 23-26, the actuator control 39 (FIG. 26), located in the cab 8 (FIG. 26), controls whether the actuator arm 61b (FIGS. 23 and 24) or the actuator arms 71b, 72b (FIG. 25) are extended or retracted. Referring to FIG.

Figure 26:
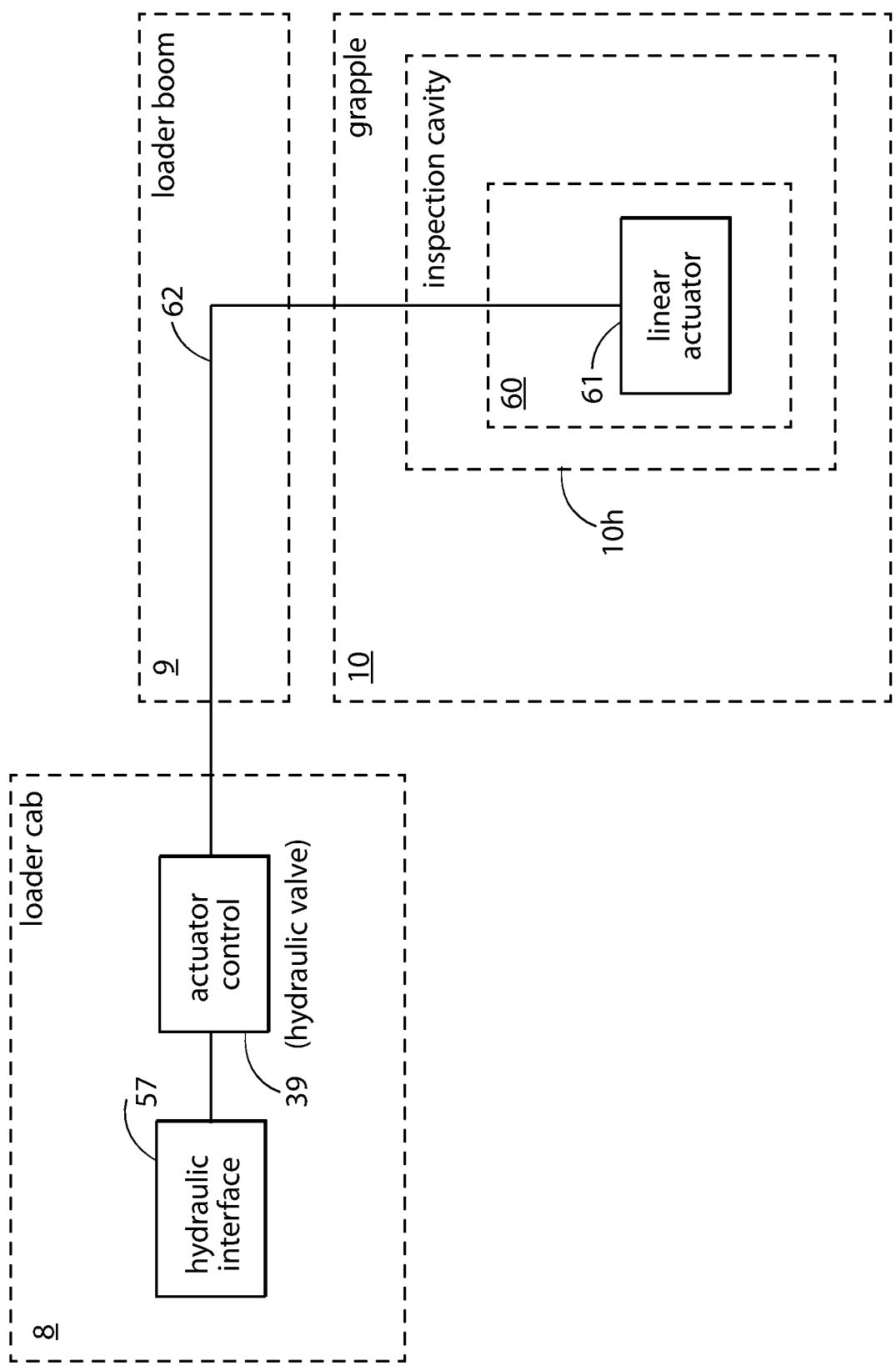
FIG. 26 illustrates a typical hydraulic diagram of the log wrapper securement device integrated into the log loader.

26, the actuator control 39 is typically a hydraulic control valve. The hydraulic fluid and fluid pressure can be provided by the hydraulic system built into the log loader 7 of FIGS. 14, 18, and 19. Referring to FIGS. 23, 24, and 26, one or more hydraulic control lines, for example, actuator control line 62 (FIGS. 23 and 26) or actuator control line 73, 74 (FIG. 24) can be routed from the actuator control 39 (FIG. 26) in the cab 8 (FIG. 26) along the boom 9 (FIG. 26) into the inspection cavity 10h (FIG. 26) of the forestry grapple 10 (FIG. 26). The actuator control 39 can be a hydraulic control valve or can control a hydraulic control valve. For example, the actuator control 39 can be a mechanical control that directly controls the flow of hydraulic fluid. The actuator control 39 can be an electrical switch in combination with a hydraulic valve. The actuator control 39 can be a computer control module, or a control module with a processor, microcontroller, or equivalent circuitry, that controls a hydraulic control valve. A physical switch or other physical control can trigger the control module. The control module can include a graphical user interface with a virtual control. The control module can include a wireless transmitter or receiver that allows for virtual control from a mobile device such as a cell phone or tablet. The wireless transmitter or receiver can be, for example, 802.11, Bluetooth, by mobile carrier, or other wireless transmission protocols.

Referring to FIGS. 5, 6, 25, and 26, the actuator control lines 62, (FIGS. 24 and 26) and actuator control lines 73, 74 (FIG. 25) can be bundled with the hydraulic hoses 13 (FIGS. 5 and 6) that control the forestry grapple 10 (FIGS. 5, 6, and 26). Referring to FIGS. 14, 18, and 19, if the log loader has a spare hydraulic line feeding the grapple, it may be possible to use this with little or no modification. Referring to FIG. 26, once in the inspection cavity 10h, the actuator control line 62 can connect to the linear actuator 61 with the log wrapper securement device 60. Referring to FIG. 25, similarly, once in the inspection cavity 10h (not shown), the actuator control lines 73, 74 can connect to the linear actuators 71, 72 respectively. Note that it may be desirable to have both linear actuators 71, 72, controlled by a single control line. In that case, actuator control lines 73, 74 would typically be fed from a splitter that is feed from a single control line.

The log wrapper securement device 60 of FIGS. 23 and 24 operate in a similar manner to the log wrapper securement device 20 of FIGS. 7-10. The log wrapper securement device 60 of FIG. 25 operates in a similar manner to the log wrapper securement device 40 of FIGS. 20 and 21. Referring to FIGS. 23 and 24, the linear actuator 61 extends and contracts the rod 22 across the length of the slot 21a (i.e., transverse to the length of the slot 21a) and through a bracket 24. In the contracted position, the chain end link 5d of FIG. 17 can be inserted in the slot 21a. In the extended position, the chain end link 5d is secured in place by the slot 21a, rod 22 and a bracket 24. The linear actuator 61 can be any type of hydraulic actuator capable of providing enough holding force to hold the chain link 5f, such as the chain end link 5d, while the forestry grapple 10 (FIGS. 14, 18, and 19) is being lifted over the logging truck 1 (FIGS. 14, 18, and 19). For example, the linear actuator 61, can be a single-acting spring return or dual-acting spring return actuator. A single-acting spring return actuator can be used to assure that the resting position of the linear actuator 61 is extended (i.e., closed with respect to the bracket 24). This can help keep dirt and dust out during normal operations.

Referring to FIG. 25, the linear actuators 71, 72 extend and contract the rods 44, 45 across the length of the slots 41a, 41b, and through brackets 46, 47, respectively. In the contracted position, the chain end link 5d of FIG. 17 can be inserted in the slot 41a or slot 41b. In the extended position, the chain end link 5d is secured in place by the slot 41a, rod 44 and bracket 46 or by the slot 41b, rod 45, and bracket 47. Referring to FIG. 23, the bracket 24, can be u-shaped with the u-shape formed by a first bracket arm 24a, a second bracket arm 24b, and a crossbar 24c. The bracket 24 can be other shapes or configurations as previously described. In the extended position, the rod 22 extends through a first aperture 24d in the first bracket arm 24a and into a second aperture 24e in the second bracket arm 24b. The second aperture 24e is illustrated as a blind hole because a blind hole provides a positive end stop for the rod 22. However, the second aperture can also be a through hole.

The linear actuator 61 and bracket 24 of FIGS. 23 and 24 or the linear actuators 71, 72 and brackets 46, 47 of FIG. 25 can be secured to the bottom surface 21d of the base plate 21. The brackets can be secured by welding, adhesive, a threaded fastener, or any manner of securing that can withstand the day-to-day operations of a forestry grapple and log loader in commercial logging operations.

The base plate 21 of FIGS. 23 and 24 can be similarly configured to the base plate 21 of FIG. 11 as previously described. The base plate 41 of FIG. 25 can be configured similarly to the base plate 41 of FIG. 20. Referring to FIG. 23, the base plate 21 can include a slot 21a, and optionally include first indent 21b and second indent 21c, sized, shaped, and configured in a similar manner as previously described. The base plate 41 of FIG. 25 can optionally include indents 41c, 41d, 41e, 41f of FIG. 20, configured as previously described. Referring to FIGS. 24 and 25, the base plate 21 includes fastener-receiving apertures 21e, 21f, 21g, 21h. The fastener-receiving apertures 21e, 21f, 21g, 21h are sized and shaped to receive and passthrough portions of the threaded fasteners, as previously described.

A log wrapper securement device 20, 40, 60, 70, system, and method for using the log wrapper securement device 20, 40, 60, 70 has been described in this disclosure. It is not the intent of this disclosure to limit the claimed invention to the examples, variations, and exemplary embodiments described in the specification. Those of ordinary skill in the art will recognize that variations will occur when embodying the claimed invention in specific implementations and environments. For example, the forestry grapple 10 of FIGS. 5, 6, 12, 14, 18, and 19 is typical of a forestry grapple attached to a log loader, such as the log loader 7 of FIGS. 14, 18, and 19. As illustrated, the inventor believes that the log wrapper securement device 20 can be used in a range of logging forestry grapples, for example, logging forestry grapples manufactured by Jewel Attachment LLC, Caterpillar Inc., T-Mar Industries Ltd., Pierce Pacific Manufacturing Inc., and Young Corporation. The placement of the inspection cavity 10h (FIG. 12) and the dimensions of the inspection cavity may vary. The dimensions of the base plate 21, 41 (FIGS. 11 and 20, respectively) the placement of the fastener-receiving apertures 21e, 21f, 21g, 21h (FIG. 11), fastener-receiving apertures 41g, 41h, 41i, 41j (FIG. 20), slots 21a (FIG. 11), slots 41a, 41b (FIG. 20), or the linear actuators 23, 61 (FIGS. 10 and 24 respectively), linear actuators 42, 43 (FIG. 21), or linear actuators 71, 72 (FIG. 25) can be adjusted to accommodate these variations. It is the inventor's intent that these variations fall within the scope of the claimed invention.

The linear actuators 23, 61 (FIGS. 10 and 24 respectively), linear actuators 42, 43 (FIG. 21) and linear actuators 71, 72 (FIG. 25) are typical of electric and hydraulic actuators suitable for use with the log wrapper securement device. Other linear actuators can be used as long as they have a holding force typically encountered when lifting the log wrapper 5 (FIG. 17) over loaded logs, such as those illustrated in FIGS. 14, 18, and 19, and can withstand the environmental conditions typically encountered in a forest logging operation.

The bracket 24 in FIGS. 9, 17, 23 is illustrated as u-shaped. However, the bracket 24 (FIGS. 9, 17, and 23), as well as brackets 46, 47 (FIGS. 21 and 25) can be other forms or shapes that can act as a side guard for the chain end link 5*d* (FIG. 17) and allow the rod 22 to pass into and secure the log wrapper 5 (FIG. 17) to the log wrapper securement device 20. For example, the bracket 24 can be a pair of L-brackets with one leg of each of the brackets 24 secured to the base plate 21 and the other leg of each bracket projecting upward from the base plate 21. The brackets 46, 47 can be a pair of L-brackets with one leg of each of the brackets 46, 47 secured to the base plate 41 and the other leg of each bracket projecting upward from the base plate 41. The brackets 24, 46, 47 can be a pair of bracket beams projecting directing upward. The bracket 24 can be integrated into the base plate 21. The brackets 46, 47 can be integrated into the base plate 41. For example, the baseplate 21, 41 and their respective brackets can be formed together as an extrusion during manufacturing. These examples of brackets preforming equivalent functions can be readily used based on the discussion in the present disclosure.

Throughout this disclosure, the log wrapper securement devices 20, 40, 60, 70 are shown with their associated components positioned within the inspection cavity 10*h* and the base plates 21, 41 covering the inspection cavity 10*h*. This has many advantages, that have been described. However, it is possible to mount the log wrapper securement devices 20, 40, 60, 70 in other locations on the forestry grapple 10 (FIGS. 5, 6, 14, 18, and 19). Referring to FIG. 9, in general, the top surface 21*i* of the base plate 21 can be an outward facing surface of an enclosure, and the bottom surface 21*d* of the base plate 21 an inward facing surface of the enclosure. The linear actuator 23, rod 22, and the bracket 24 are enclosed within the enclosure because the linear actuator 23 and bracket 24 are secured to the bottom surface of the base plate 21. Referring to FIG. 5, the enclosure can be internal to the forestry grapple 10, such as the inspection cavity 10*h*, as previously described. As further examples, the enclosure could be a grapple body cavity 10*q* under the service plate 10*r* mounted on the grapple body 10*b*. The enclosure could be an enclosure externally secured to the forestry grapple 10. For example, the enclosure could be mounted on the grapple body shield 10*s*. The enclosure can be mounted over the inspection cavity 10*h* or elsewhere on the grapple head 10*a*. These further examples may require modification of the forestry grapple 10, for example drilling holes to route hydraulic hoses or electrical wires. In addition, some of these further examples may not be as well protected from the external environment (for example, rain, snow, branches, logs, and debris) as using the inspection cavity 10*h* as the enclosure. Therefore, care must be taken as to what environments these implementations might be suitable for.

It is possible to implement certain features described in separate embodiments in combination within a single embodiment. Similarly, it is possible to implement certain features described in single embodiments either separately or in combination in multiple embodiments. The inventor envisions that these variations fall within the scope of the claimed invention. For example, any explanation about structure, function, and advantage described for FIGS. 9, 10, and 21 that are not specific to an electrical actuator, can be applied to the linear actuator 61 of FIGS. 23 and 24 and linear actuators 71, 72 of FIG. 25. Similarly, any structure, function, or advantage described for FIGS. 23-25, that are not specific to hydraulic actuators, can be applied to the linear actuator 23 of FIGS. 9, and 10, or the linear actuators 42, 43 of FIG. 21.

A method of placing a log wrapper 5 (FIGS. 14, 16-19) with a chain end link 5*d* or chain links 5*f* (both in FIG. 17) over a logging truck was described for FIGS. 13-19. The linear actuators 42, 43 of FIG. 21, the linear actuator 61 of FIGS. 23 and 24, and the linear actuator 71 of FIG. 25 can be readily substituted when one of ordinary skill in the art reads and understands the present disclosure.

While the examples, exemplary embodiments, and variations are helpful to those skilled in the art in understanding the claimed invention, it should be understood that, the scope of the claimed invention is defined solely by the following claims and their equivalents.

Any appended claims are not to be interpreted as including means-plus-function limitations, unless a claim explicitly evokes the means-plus-function clause of 35 USC § 112(f) by using the phrase "means for" followed by a verb in gerund form.

"Optional" or "optionally" is used throughout this disclosure to describe features or structures that are optional. Not using the word optional or optionally to describe a feature or structure does not imply that the feature or structure is essential, necessary, or not optional. Describing an advantage of an implementation or example of the log wrapper securement devices 20, 40, 60, 70 does not imply that the implementation or example is essential or required. However, when discussing advantages of the log wrapper securement devices 20, 40, 60, 70 over the prior art, part of the purpose of this is to distinguish the log wrapper securement device 20, 40, 60, 70 from the prior art and to demonstrate part of the inventor's contribution to the art.

Using the word "or," as used in this disclosure is to be interpreted as the ordinary meaning of the word "or" (i.e., an inclusive or) For example, the phrase "A or B" can mean any of the following: A, B, A with B. For example, if one were to say, "I will wear a waterproof jacket if it snows or rains," the meaning is that the person saying the phrase intends to wear a waterproof jacket if it rains alone, if it snows alone, if it rains and snows in combination.

What is claimed is:

1. A log wrapper securement device for receiving, holding, and releasing a chain link of a log wrapper to a forestry grapple, the forestry grapple including an inspection cavity, comprising:

a base plate including a top surface, a bottom surface opposite the top surface, and a slot through the top surface and the bottom surface;

the base plate sized and shaped to cover the inspection cavity;

a linear actuator and a bracket each secured to the bottom surface, a rod extending from the linear actuator;

the linear actuator, the bracket, and the slot are so positioned on the base plate, so that with the inspection cavity being covered by the top surface, the linear actuator and the bracket are positioned within the inspection cavity; and with the chain link being inserted in the slot, remotely activating the linear actuator causes the rod to extend through the bracket and across the slot holding and securing the chain link to the log wrapper securement device.

2. The log wrapper securement device of claim 1, further including:
a first indent and a second indent indented in the top surface on opposing sides of the slot; and
the first indent and the second indent sized, shaped, and positioned to support a second chain link of the log wrapper as the chain link is inserted in the slot.

3. The log wrapper securement device of claim 1, wherein:
the linear actuator includes a linear actuator body and an actuator arm extending from the linear actuator body;
the rod is secured to the actuator arm and offset to extend between the actuator arm and the bottom surface of the base plate; and
extending and retracting the actuator arm extends and retracts the rod.

4. The log wrapper securement device of claim 1, wherein:
the bracket includes a first bracket arm, a second bracket arm, a crossbar joining the first bracket arm and the second bracket arm, and a bracket internal cavity positioned between the first bracket arm, the second bracket arm, and the crossbar;
the bracket internal cavity is positioned over the slot; and
the rod extends into the first bracket arm and the second bracket arm.

5. A method of placing a log wrapper with a chain link over a logging truck, comprising:
remotely securing the chain link in a log wrapper securement device, the log wrapper securement device secured to a forestry grapple, the forestry grapple connected to a log loader; and
lifting the forestry grapple and the log wrapper over the logging truck using the log loader and then remoting releasing the chain link.

6. The method of claim 5, wherein:
the forestry grapple is retracted into a heel of the log loader.

7. The method of claim 5, further including:
inserting the chain link in a slot before remotely securing the chain link in the log wrapper securement device; and
the slot is positioned through a base plate of the log wrapper securement device and a top surface of the base plate is covering an inspection cavity in the forestry grapple.

8. The method of claim 7, wherein:
remotely securing the chain link in the log wrapper securement device includes remotely activating a linear actuator, the linear actuator extending a rod under the slot to secure the chain link.

9. The method of claim 5, wherein:
remotely securing the chain link in the log wrapper securement device includes remotely activating a linear actuator, the linear actuator extending a rod under a slot to secure the chain link, the slot is positioned through a top surface of a base plate of the log wrapper securement device, and the top surface covers an inspection cavity in the forestry grapple.

10. A system for engaging and releasing a log wrapper with a chain link, comprising:
(a) a forestry grapple;
(b) a log wrapper securement device, including:
a base plate secured to the forestry grapple;
the base plate includes a top surface facing outward away from the forestry grapple, a bottom surface opposite the top surface and facing the forestry grapple, and a slot through the top surface and the bottom surface;
a linear actuator and a bracket each secured to the bottom surface and a rod extending from the linear actuator and into the bracket; and
with the chain link being inserted in the slot, remotely activating the linear actuator causes the rod to extend through the bracket and across the slot, holding and securing the chain link to the forestry grapple.

11. The system of claim 10, further including:
a first indent and a second indent indented in the top surface on opposing sides of the slot; and
the first indent and the second indent sized, shaped, and positioned to support a second chain link of the log wrapper as the chain link is inserted in the slot.

12. The system of claim 10, wherein:
the forestry grapple includes an inspection cavity; and
the linear actuator, the bracket, and the rod are positioned within the inspection cavity and the base plate covers the inspection cavity.

13. The system of claim 12, further including:
an actuator control line and an actuator control connected to the actuator control line, remotely activating and deactivating the linear actuator; and
the actuator control line is routed through the inspection cavity.

14. The system of claim 12, further including:
a first indent and a second indent indented in the top surface on opposing sides of the slot; and
the first indent and the second indent sized, shaped, and positioned to support a second chain link of the log wrapper as the chain link is inserted in the slot.

15. The system of claim 12, wherein:
the bracket includes a first bracket arm, a second bracket arm, a crossbar joining the first bracket arm and the second bracket arm, and a bracket internal cavity positioned between the first bracket arm, the second bracket arm, and the crossbar;
the bracket internal cavity is positioned over the slot; and
the rod extends into the first bracket arm and the second bracket arm.

16. The system of claim 12, wherein:
the linear actuator includes a linear actuator body and an actuator arm extending from the linear actuator body;
the rod is secured to the actuator arm and offset to extend between the actuator arm and the bottom surface of the base plate; and
extending and retracting the actuator arm extends and retracts the rod.

17. The system of claim 10, wherein:
the bracket includes a first bracket arm, a second bracket arm, a crossbar joining the first bracket arm and the second bracket arm, and a bracket internal cavity positioned between the first bracket arm, the second bracket arm, and the crossbar;
the bracket internal cavity is positioned over the slot; and
the rod extends into the first bracket arm and the second bracket arm.

18. The system of claim 10, wherein:
the linear actuator includes a linear actuator body and an actuator arm extending from the linear actuator body;
the rod is secured to the actuator arm and offset to extend between the actuator arm and the bottom surface of the base plate; and extending and retracting the actuator arm extends and retracts the rod.

\* \* \* \* \*